United States Patent
Choe et al.

(10) Patent No.: US 10,285,553 B2
(45) Date of Patent: May 14, 2019

(54) CYCLONE DUST COLLECTING APPARATUS AND CLEANER HAVING THE SAME

(71) Applicant: Samsung Electronics Co., Ltd., Suwon-si (KR)

(72) Inventors: Jun Hoo Choe, Gwangju (KR); Jong Gook Lim, Gwangju (KR); Jin Ho Lee, Suwon-si (KR); Kyong Hui Jeon, Seosan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 15/477,260

(22) Filed: Apr. 3, 2017

(65) Prior Publication Data

US 2017/0202418 A1    Jul. 20, 2017

Related U.S. Application Data

(63) Continuation of application No. 14/275,001, filed on May 12, 2014, now abandoned.

(30) Foreign Application Priority Data

Feb. 10, 2014  (KR) .................. 10-2014-0015014

(51) Int. Cl.
    *B01D 50/00*        (2006.01)
    *A47L 9/16*         (2006.01)
    (Continued)

(52) U.S. Cl.
    CPC ............ *A47L 9/1683* (2013.01); *A47L 9/165* (2013.01); *A47L 9/1608* (2013.01);
    (Continued)

(58) Field of Classification Search
    CPC ...... A47L 9/1683; A47L 9/165; A47L 9/1691; A47L 9/1608; A47L 9/1666; B01D 45/16;
    (Continued)

(56) References Cited

U.S. PATENT DOCUMENTS

| | | | | |
|---|---|---|---|---|
| 4,270,668 A | * | 6/1981 | Berfield | A47L 9/00 220/324 |
| 6,406,505 B1 | * | 6/2002 | Oh | A47L 5/362 15/353 |

(Continued)

OTHER PUBLICATIONS

U.S. Species Election Requirement dated Nov. 18, 2015 in co-pending U.S. Appl. No. 14/275,001.

(Continued)

*Primary Examiner* — Dung H Bui
(74) *Attorney, Agent, or Firm* — Staas & Halsey LLP

(57) ABSTRACT

A cyclone dust collecting apparatus and a cleaner having the same include a grille unit including an introduction pipe communicating with the suction port and adapted to guide the air into the main cyclone chamber, and a grille body detachably provided to the introduction pipe and allowing the air to be discharged from the main cyclone chamber after dust particles in the air having a size greater than or equal to a certain size is filtered out. With this configuration, the spatial utilization of the cyclone structure may be facilitated, and visualization of the dust collection chamber may allow a user to gain satisfaction from cleaning operation.

16 Claims, 16 Drawing Sheets

(51) Int. Cl.
*B01D 45/08* (2006.01)
*B01D 45/16* (2006.01)
*B04C 5/00* (2006.01)

(52) U.S. Cl.
CPC ........... *A47L 9/1641* (2013.01); *A47L 9/1666* (2013.01); *A47L 9/1691* (2013.01); *B01D 45/08* (2013.01); *B01D 45/16* (2013.01); *B01D 50/002* (2013.01); *B04C 5/00* (2013.01); *Y10T 292/0894* (2015.04); *Y10T 292/0911* (2015.04)

(58) Field of Classification Search
CPC ...... B01D 50/002; B01D 45/12; B01D 45/08; B04C 3/06; B04C 2003/006; Y10T 292/0911; Y10T 292/0926; Y10T 292/0945; Y10T 292/0948; Y10T 292/0894; Y10T 292/0895; Y10T 292/0902
See application file for complete search history.

(56) References Cited

U.S. PATENT DOCUMENTS

| | | | | |
|---|---|---|---|---|
| 6,951,318 B1* | 10/2005 | Petersen | ............. | E02D 29/1427 220/315 |
| 7,883,560 B2 | 2/2011 | Ni | | |
| 8,689,400 B2 | 4/2014 | Lee | | |
| 2001/0054213 A1* | 12/2001 | Oh | ........................ | A47L 9/1633 15/353 |
| 2004/0112018 A1* | 6/2004 | Vuijk | .................... | A47L 9/1625 55/346 |
| 2004/0163207 A1 | 8/2004 | Oh | | |
| 2005/0252179 A1 | 11/2005 | Oh | | |
| 2006/0230715 A1 | 10/2006 | Oh | | |
| 2006/0230720 A1* | 10/2006 | Han | ...................... | A47L 9/1641 55/345 |
| 2006/0230726 A1 | 10/2006 | Oh | | |
| 2006/0236663 A1 | 10/2006 | Oh | | |
| 2006/0254226 A1 | 11/2006 | Jeon | | |
| 2006/0278081 A1 | 12/2006 | Han | | |
| 2007/0079580 A1 | 4/2007 | Oh | | |
| 2007/0079583 A1 | 4/2007 | Oh | | |
| 2007/0095029 A1* | 5/2007 | Min | ........................ | A47L 9/122 55/345 |
| 2007/0119129 A1 | 5/2007 | Jeon | | |
| 2008/0172995 A1* | 7/2008 | Conrad | .................. | A47L 9/1608 55/345 |
| 2008/0282894 A1 | 11/2008 | Makarov | | |
| 2009/0193771 A1 | 8/2009 | Oh | | |
| 2009/0205299 A1* | 8/2009 | Oh | ........................ | A47L 9/1641 55/347 |
| 2010/0083833 A1* | 4/2010 | Morphey | ............... | A47L 9/1608 95/268 |
| 2010/0132316 A1 | 6/2010 | Ni | | |
| 2010/0132319 A1* | 6/2010 | Ashbee | .................. | A47L 9/1625 55/429 |
| 2010/0162517 A1 | 7/2010 | Han | | |
| 2010/0199454 A1* | 8/2010 | Pruitt | ........................ | A47L 5/38 15/301 |
| 2010/0224073 A1 | 9/2010 | Oh | | |
| 2010/0242222 A1* | 9/2010 | Conrad | ..................... | A47L 5/28 15/347 |
| 2010/0299865 A1* | 12/2010 | Conrad | ..................... | A47L 5/24 15/353 |
| 2012/0210537 A1* | 8/2012 | Makarov | ............... | A47L 9/1608 15/353 |
| 2012/0311814 A1* | 12/2012 | Kah, Jr. | .................. | A47L 5/365 15/347 |
| 2013/0333156 A1* | 12/2013 | McLuckie | ................. | A47L 5/30 15/353 |
| 2014/0245565 A1* | 9/2014 | Conrad | ................. | A47L 9/1691 15/353 |

OTHER PUBLICATIONS

U.S. Office Action dated Feb. 5, 2016 in co-pending U.S. Appl. No. 14/275,001.
U.S. Final Office Action dated May 23, 2016 in co-pending U.S. Appl. No. 14/275,001.
U.S. Advisory Action dated Aug. 1, 2016 in co-pending U.S. Appl. No. 14/275,001.
U.S. Office Action dated Aug. 15, 2016 in co-pending U.S. Appl. No. 14/275,001.
U.S. Final Office Action dated Dec. 2, 2016 in co-pending U.S. Appl. No. 14/275,001.
U.S. Advisory Action dated Mar. 6, 2017 in co-pending U.S. Appl. No. 14/275,001.
U.S. Appl. No. 14/275,001, filed May 12, 2014, Jun Hoo Choe et al., Samsung Electronics Co., Ltd.

* cited by examiner

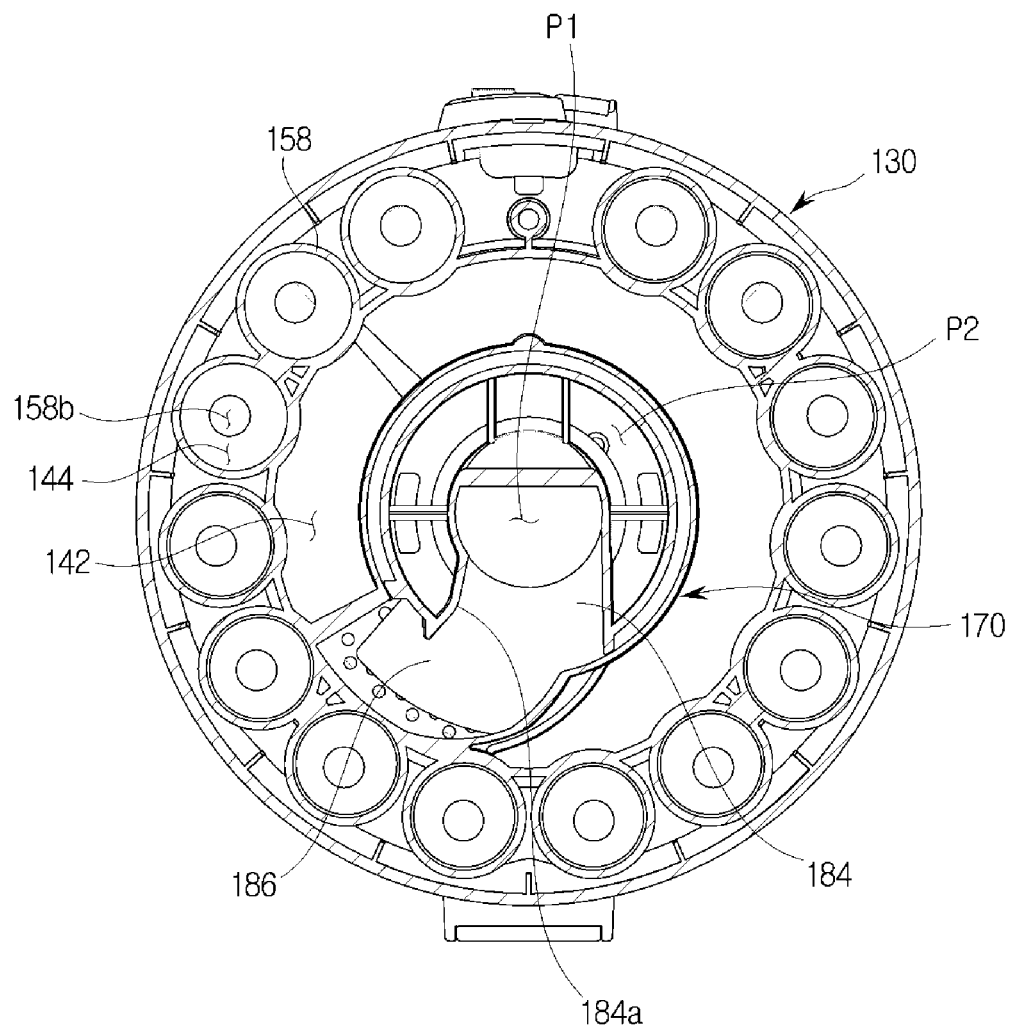

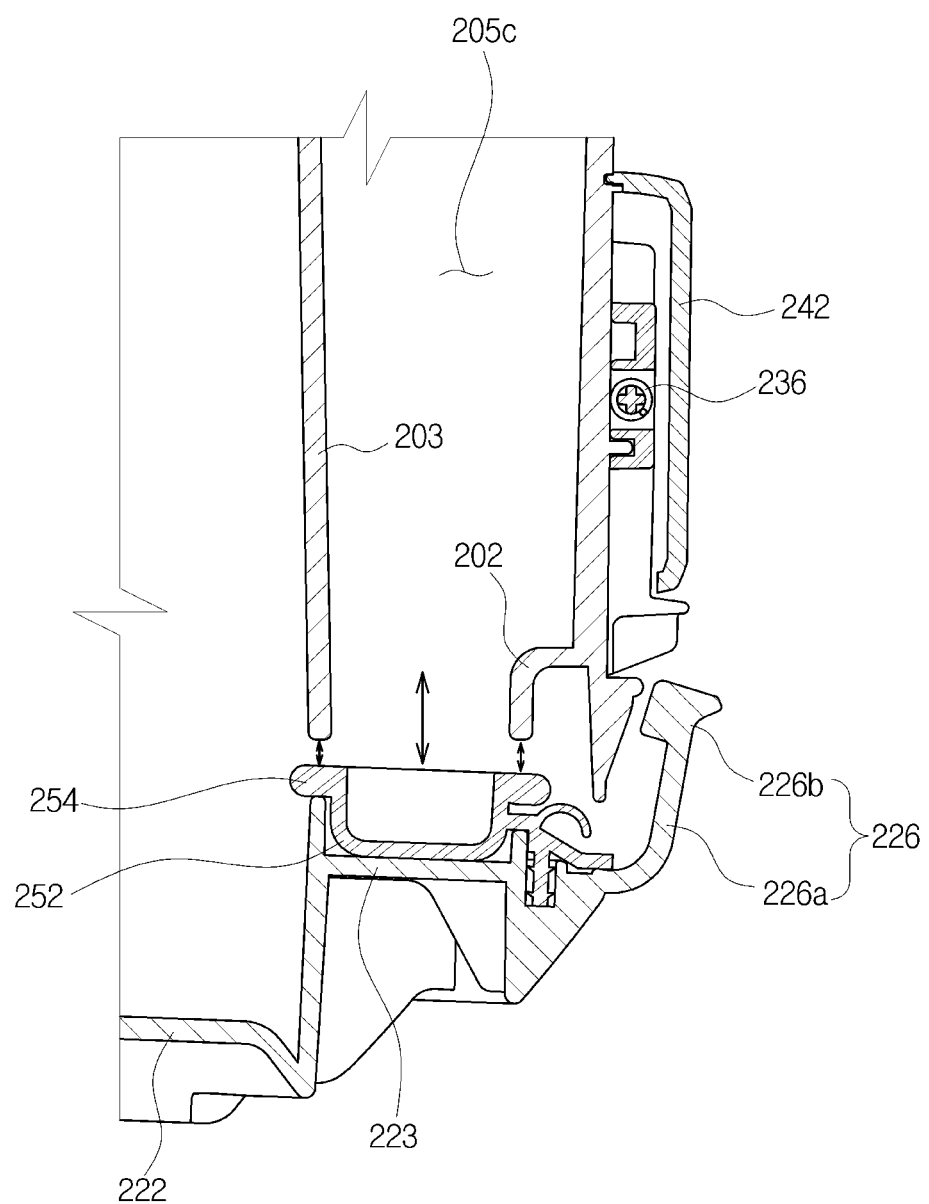

CYCLONE DUST COLLECTING APPARATUS AND CLEANER HAVING THE SAME

CROSS-REFERENCE TO RELATED APPLICATIONS

This application is a continuation of U.S. patent application Ser. No. 14/275,001, filed on May 12, 2014, which claims priority benefit from Korean Patent Application No. 10-2014-0015014, filed on Feb. 10, 2014 in the Korean Intellectual Property Office, the disclosures of which are incorporated herein by reference.

BACKGROUND

1. Field

Embodiments of the present invention relate to a cyclone dust collecting apparatus having an improved structure of a flow passage and a cleaner having the same.

2. Description of the Related Art

Generally, a vacuum cleaner, which is a home appliance constructed to perform cleaning, includes a fan motor to generate suction force, a suction part to suction air on a surface to be cleaned with the suction force of the fan motor, and a dust collecting apparatus to separate dust from the air suctioned through the suction part, collect the same, and discharge purified air.

A cyclone dust collecting apparatus, which is one of dust collecting apparatuses, separates dust from the suctioned air using centrifugal force. The cyclone dust collecting apparatus is widely used since it is semi-permanently usable, and also is more hygienic and convenient to use than a dust collecting apparatus employing a dust bag.

The cyclone dust collecting apparatus may be applicable to any type of vacuum cleaner including canister type cleaners, upright type cleaners, and hand-held type cleaners.

The cyclone dust collecting apparatus causes the air introduced from the suction part to flow into a side part of the dust collecting apparatus to generate rotating airflow. Accordingly, flow resistance of air may increase and a separate air pipe may need to be disposed.

SUMMARY

Therefore, it is an aspect of the present invention to provide a cyclone dust collecting apparatus having an improved structure of internal flow passages and a cleaner having the same.

It is another aspect of the present invention to provide a cyclone dust collecting apparatus including an improved opening and closing structure to facilitate opening and closing of the dust collecting apparatus and a cleaner having the same.

Additional aspects of the invention will be set forth in part in the description which follows and, in part, will be obvious from the description, or may be learned by practice of the invention.

In accordance with one aspect of the present invention, a cyclone dust collecting apparatus includes a dust collecting case including a suction port and discharge port to allow introduction and discharge of air, and a cyclone unit to generate rotating airflow in the dust collecting case, the cyclone unit includes a main cyclone chamber to rotate the air introduced through the suction port to separate dust from the air through centrifugation, and a grille unit to guide flow of air introduced into and discharged from the main cyclone chamber, the grille unit includes an introduction pipe communicating with the suction port and adapted to guide the air into the main cyclone chamber, and a grille body detachably coupled to the introduction pipe and allowing the air to be discharged from the main cyclone chamber after dust particles in the air having a size greater than or equal to a certain size (i.e, a predetermined or a maximum size) are filtered out.

The cyclone unit may further include an airflow creation part adapted to rotate the air guided from the introduction pipe to the main cyclone chamber.

The airflow creation part may be formed along a circumference of the grille unit to allow the air to form rotating airflow.

In the cyclone dust collecting apparatus, the airflow creation part may include a first airflow guide surface including a surface contacting the air discharged from the introduction pipe, at least one portion of the surface being concavely formed to allow the air guided to the main cyclone chamber to rotate around the grille unit in a circumferential direction, and a second airflow guide surface inclined toward the main cyclone chamber in the circumferential direction to allow the air rotated by the first airflow guide surface to move toward the main cyclone chamber.

The first airflow guide surface may be formed in a shape of a curved surface to divert the air.

The introduction pipe may include an introduction pipe body having one end communicating with the suction port, and a guide part provided to the other end of the introduction pipe body to guide the air to the main cyclone chamber.

The guide part may include a discharge guide surface having a shape of a curved surface, the discharge guide surface being formed in a direction of rotation of the air in the main cyclone chamber.

The grille unit may include an airflow creation rib extending from the guide part in a direction of discharge of the air to space the air discharged from the guide part apart from the grille body and introduce the air into the main cyclone chamber.

The cyclone unit may further include a cyclone body concavely formed to allow the grille unit to be inserted and coupled thereto, the cyclone body forming at least one portion of the main cyclone chamber.

The introduction pipe body and the grille body may be disposed such that centerlines thereof with respect to longitudinal directions of the introduction pipe body and the grille body coincide with each other.

The guide part may extend from the introduction pipe body such that the guide part is bent in a radial direction with respect to a longitudinal direction of the introduction pipe body.

The grille unit may include a first flow passage formed in the introduction pipe to guide the air introduced through the introduction inlet, a second flow passage formed between the introduction pipe and the grille body to guide, to an outside of the grille unit, the air introduced into the grille body from the main cyclone chamber.

The first flow passage and the second flow passage may be formed in the same direction.

The grille body may be arranged to surround the introduction pipe while being spaced a certain distance from the introduction pipe.

The dust collecting case may further include a dust collection chamber to collect dust separated from the air in the main cyclone chamber, wherein the grille unit may further include a flange grille extending from an outer surface of the introduction pipe in a radial direction, the flange grille being disposed between the main cyclone chamber and the dust collection chamber to prevent backflow of dust collected in the dust collection chamber.

The flange grille may be inclined toward the dust collection chamber.

The flange grille may be formed in a shape of a grille to filter out dust flowing back from the dust collection chamber to the main cyclone chamber.

The dust collecting case may include a dust collection container provided therein with a dust collection chamber allowing the dust separated from the air in the main cyclone chamber to be collected therein, wherein the suction port may be formed in the dust collection container and adapted to communicate with the introduction pipe.

The cyclone dust collecting apparatus may further include an auxiliary cyclone chamber disposed in a radial direction of the main cyclone chamber to cause the air primarily separated from dust in the main cyclone chamber to be secondarily separated from dust in the air through centrifugation.

The dust collecting case may include a dust collection container provided therein with a dust collection chamber allowing the dust separated from the air in the main cyclone chamber to be collected therein, wherein the dust collection chamber may include a first dust collection chamber disposed under the main cyclone chamber, and a second dust collection chamber disposed under the auxiliary cyclone chamber, the second dust collection chamber being formed to have a depth greater than a depth of the second dust collection chamber adjacent thereto such that the dust collected in the second dust collection chamber is collected in the second dust collection chamber.

The dust collecting case may include a dust collection container provided therein with a dust collection chamber allowing the dust separated from the air in the main cyclone chamber to be collected therein, wherein the dust collection chamber may include a first dust collection chamber disposed under the main cyclone chamber, and a second dust collection chamber disposed in an annular shape under the auxiliary cyclone chamber, the second dust collection chamber being arranged along a circumference of the first dust collection chamber over the first dust collection chamber, wherein the dust collection container may be formed of a transparent material to allow interiors of the first dust collection chamber and the second dust collection chamber to be visible.

The introduction pipe may include an introduction inlet communicating with the suction port, and the grille body may include a discharge outlet communicating with the discharge port.

In accordance with one aspect of the present invention, a cyclone dust collecting apparatus includes a dust collecting case including a suction port and discharge port to allow introduction and discharge of air, and a cyclone unit to generate rotating airflow in the dust collecting case, the cyclone unit may include a cyclone chamber to rotate the air introduced through the suction port to separate dust from the air through centrifugation, a grille unit to guide, in the cyclone chamber, flow of air introduced into and discharged from the cyclone chamber, and an airflow creation part formed along a circumference of the grille unit to allow the air discharged from the grille unit to form rotating airflow in the cyclone chamber.

The grille unit may include an introduction pipe communicating with the suction port and adapted to guide the air into the main cyclone chamber, and a grille body detachably provided to the introduction pipe and allowing the air to be discharged from the cyclone chamber after dust particles in the air having a size greater than or equal to a certain size is filtered out.

The introduction pipe may include an introduction pipe body having one end communicating with the suction port, and a guide part provided to the other end of the introduction pipe body to discharge the air to the cyclone chamber, wherein the introduction pipe body and the grille body are disposed such that centerlines thereof with respect to longitudinal directions of the introduction pipe body and the grille body coincide with each other.

In accordance with another aspect of the present invention, a dust collecting apparatus includes a dust collecting case including a dust separation part to separate dust from air suctioned thereinto, a dust collection container including a dust collection chamber to collect the dust separated from the air, an opening to open the dust collection chamber, and a fixed protrusion formed on a surface of the dust collection container adjacent to the opening, the dust collection container being arranged at one side of the dust collecting case, a discharge cover including a cover body to open and close the opening, and a catch member adapted to be restricted by the fixed protrusion at the one side of the cover body, the discharge cover being pivotably hinged to the dust collecting case, an opening and closing member formed on one side surface of the dust collection container to release the catch member from restriction by the fixed protrusion, and a cover spacing member provided between the dust collection container and the discharge cover to space the dust collection container and the discharge cover apart from each other.

A direction of movement of the opening and closing member may be perpendicular to a direction of the discharge cover being spaced from the dust collection container.

The opening and closing member may include an opening and closing member body adapted to slide along the one side surface of the dust collection container, and a catch release part provided to the opening and closing member body to space the catch member from the fixed protrusion.

The catch release part may include a catch release surface inclined in a direction opposite to a direction of movement of the opening and closing member body to space the catch member apart from the fixed protrusion.

The catch member may include a catch member body extending from the discharge cover toward an outside of the dust collection container, and a catch protrusion provided to an end of the catch member body and adapted to be caught by the fixed protrusion.

The opening and closing member may include a restorable elastic part to press the opening and closing member body toward an original position of the opening and closing member body when the opening and closing member body slides, and an elastic pressing part allowing the restorable elastic part to be elastically supported by the opening and closing member body.

The cover spacing member may be formed of a material having elasticity.

The cover spacing member may include a seating part adapted to be seated on an inner side surface of the discharge cover, and a pressing part arranged along a circumference of the seating part and adapted to push the dust collection container through elasticity thereof when the discharge cover is opened.

The discharge cover may include a concave part formed on an inner side surface of the cover body such that the concave part is more concave than a neighboring portion of the cover body to allow the seating part to be seated thereon.

The cover spacing member may apply elastic force toward the dust collection container to space the discharge cover apart from the dust collection container.

The dust collection container may be formed in a cylindrical shape, and the cover spacing member may be formed in an arc shape at an inner side of the discharge cover.

The discharge cover may include a cover hinge adapted be hinged to the dust collection container, wherein the cover hinge, the cover spacing member, and the catch member may be disposed in the same line.

In accordance with another aspect of the present invention, a dust collecting apparatus includes a dust collecting case including a dust separation part to separate dust from air suctioned thereinto, a dust collection container including an opening having one open surface and disposed at one side of the dust collecting case, a discharge cover including a catch member formed at one side thereof to be detachably connected to the dust collection container, the discharge cover being pivotably hinged to the dust collection container to open and close the opening, a discharge cover including a catch member extending from one side thereof toward the dust collection container in a first direction to be detachably connected to the dust collection container, the other side of the discharge cover being pivotably hinged to the dust collection container to open and close the opening, an opening and closing member to move in a second direction perpendicular to the first direction to allow the catch member to escape from the dust collection container, and a cover spacing member provided between the dust collection container and the discharge cover to space the discharge cover apart from the dust collection container in a third direction opposite to the first direction.

The opening and closing member and the cover spacing member may operate independently.

The discharge cover may include a unit seating portion allowing the cover spacing member to be seated thereon, wherein the unit seating portion may be disposed closer to the one side of the discharge cover than to the other side of the discharge cover.

The cover spacing member may be disposed at the other side of the discharge cover with respect to the one side of the discharge cover pivotably hinged to the dust collection container.

The discharge cover may include a hinge adapted to be hinged to the dust collection container, wherein the hinge, the cover spacing member, and the catch member are disposed in the same line.

In accordance with another aspect of the present invention, a cleaner includes a cleaner body, and a dust collecting apparatus detachably coupled to the cleaner body to collect dirt in air, wherein the dust collecting apparatus includes a dust collection chamber having an opening and allowing dust to be collected therein, a discharge cover pivotably provided to the dust collection container to open and close the opening, one side of the discharge cover being restrictable by the dust collection container, an opening and closing member adapted to release the discharge cover from restriction by the dust collection container, and a cover spacing member to space the discharge cover apart from the dust collection container when the discharge cover is released from the restriction.

In accordance with another aspect of the present invention, a cleaner includes a cleaner body, a dust collecting apparatus detachably coupled to the cleaner body to collect dirt in air, wherein the dust collecting apparatus includes a dust collecting case having an opening, a discharge cover to open and close the opening, and a suction port provided to the discharge cover to allow suctioned air to be introduced therethrough, and a cyclone unit to generate rotating airflow in the dust collecting case, wherein the cyclone unit includes a main cyclone chamber to rotate the air introduced through the suction port to separate dust from the air through centrifugation, and a grille unit to guide flow of air introduced into and discharged from the main cyclone chamber, wherein the grille unit includes an introduction pipe connected to the suction port to guide the suctioned air to the main cyclone chamber, a grille body coupled to the introduction pipe to discharge the air having passed through the main cyclone chamber.

The dust collecting case may include a dust collection container to collect the dust separated in the cyclone unit, the dust collection container allowing the discharge cover to be pivotably mounted thereto, the cleaner further including a cover spacing member provided between the dust collection container and the discharge cover and adapted to space the dust collection container and the discharge cover apart from each other.

The discharge cover may include a cover body to open and close the opening, and a catch member provided to one side of the cover body to be restrictable by the dust collection container, the cleaner further including an opening and closing member provided to one side of the dust collection container to release the catch member from restriction by the dust collection container.

The opening and closing member may include an opening and closing member body adapted to be slidable along one side surface of the dust collection container, a catch release part provided to the opening and closing member body to space the catch member from the dust collection container.

BRIEF DESCRIPTION OF THE DRAWINGS

These and/or other aspects of the invention will become apparent and more readily appreciated from the following description of the embodiments, taken in conjunction with the accompanying drawings of which:

FIG. 7B is a cross-sectional view taken along line A-A' of FIG. 4;

FIG. 15 is a view illustrating an operation of opening a cyclone dust collecting apparatus according to one embodiment of the present invention.

DETAILED DESCRIPTION

Figure 1:
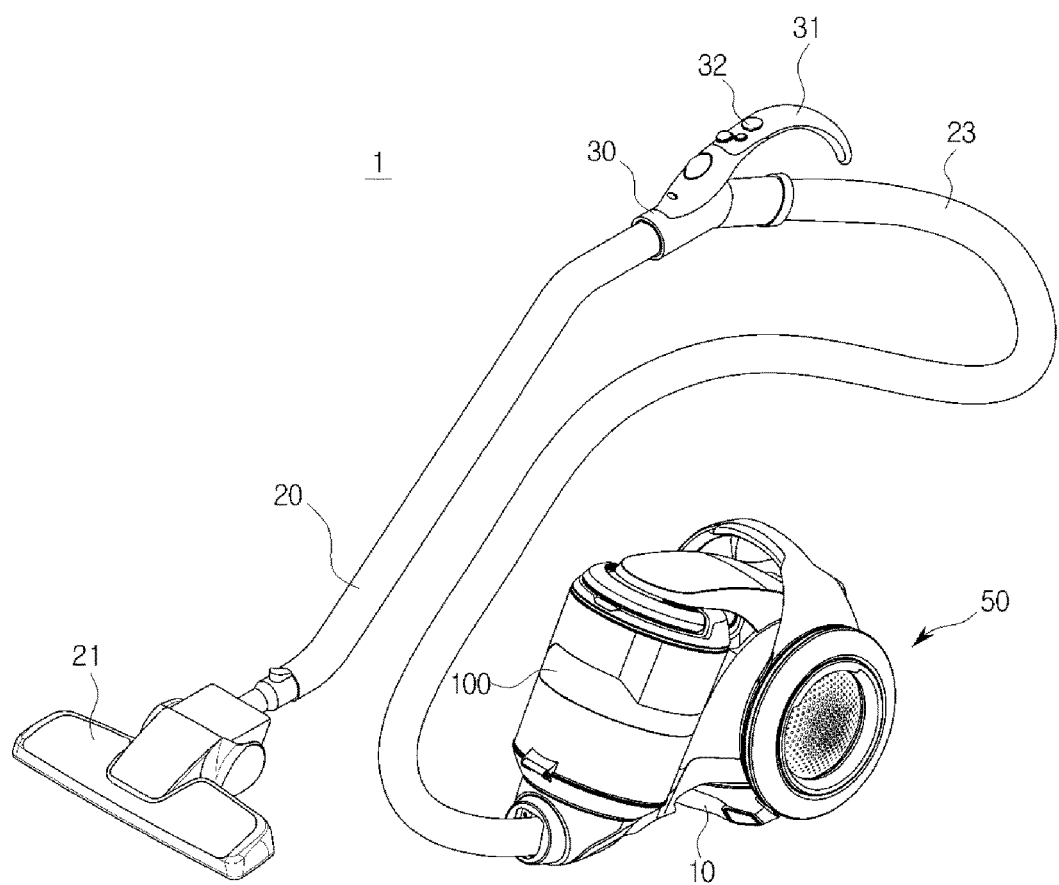
FIG. 1 is a view illustrating a cleaner according to an exemplary embodiment of the present invention.

Reference will now be made in detail to the embodiments of the present invention, examples of which are illustrated in the accompanying drawings, wherein like reference numerals refer to like elements throughout.

Figure 2:
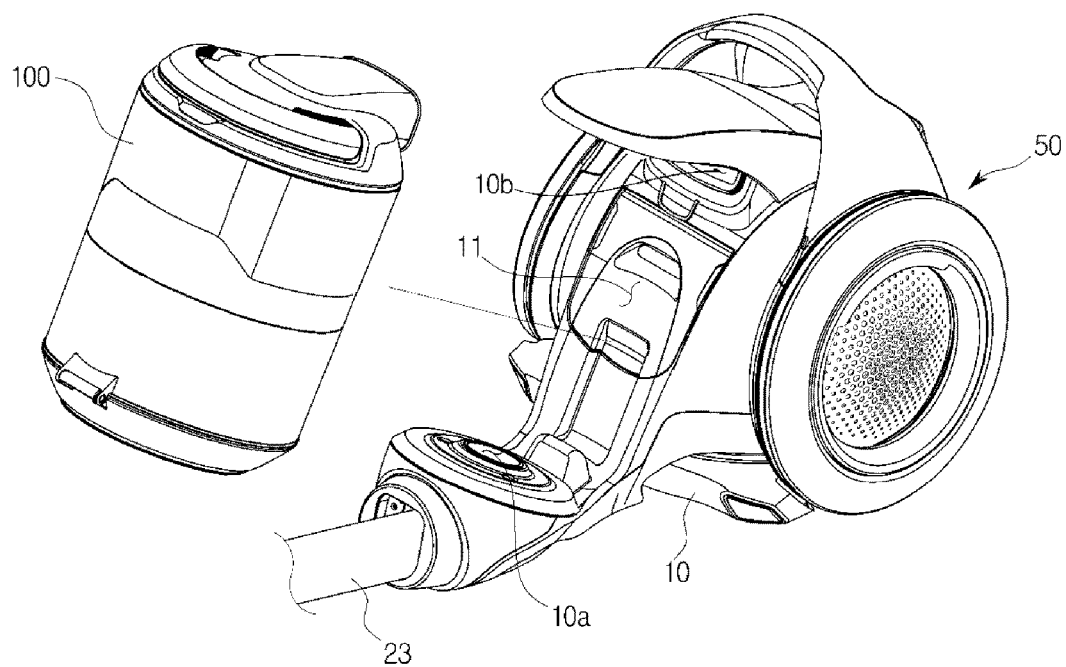
FIG. 2 is view illustrating a cyclone dust collecting apparatus separated from a cleaner according to one embodiment of the present invention.

FIG. 1 is a view illustrating a cleaner according to an exemplary embodiment of the present invention, and FIG. 2 is view illustrating a cyclone dust collecting apparatus separated from a cleaner according to one embodiment of the present invention.

Referring to FIGS. 1 and 2, a vacuum cleaner 1 includes a body 10, a dust collecting apparatus 100, a suction part 21, and a wheel assembly 50. The dust collecting apparatus 100 and the wheel assembly 50 are mounted to the body 10. The suction part 21 may contact a surface being cleaned and suction dirt and debris on the surface. The vacuum cleaner 1 may be a canister type vacuum cleaner.

The body 10 includes a fan motor (not shown) to generate suction force. The suction force generated in the body 10 allows the suction part 21 to suction air and dust in the air from the surface being cleaned. The suction part 21 may be formed to be relatively wide and flat to closely contact the surface being cleaned.

An extension pipe 20, a handle pipe 30 and a flexible hose 23 may be provided between the body 10 and the suction part 21. The extension pipe 20, which is formed of resin or metal, may connect the suction part 21 to the handle pipe 30.

The handle pipe 30 is adapted to connect the extension pipe 20 to the flexible hose 23. The handle pipe 30 may include a handle part 31 and a manipulation part 32. A user may perform cleaning while holding the handle part 31. The user may turn on/off the cleaner by manipulating a button provided to the manipulation part 32, or manipulate functions of the vacuum cleaner 1 such as adjustment of suction intensity.

The flexible hose 23 connects the handle pipe 30 to the body 10. The flexible hose 23 may be formed of a flexible material to ensure free movement of the handle pipe 30.

The suction part 21, the extension pipe 20, the handle pipe 30 and the flexible hose 23 may communicate with each other. The air drawn into the suction part 21 may sequentially pass through the extension pipe 20, the handle pipe 30 and the flexible hose 23 and flow into the body 10.

The body 10 may include a first body port 10a guiding the suctioned air to the dust collecting apparatus 100 and a second body port 10b allowing the air purified in the dust collecting apparatus 100 to be discharged therethrough. The second body port 10b may communicate with a fan motor chamber (not shown) including a fan motor (not shown).

The body 10 may include a mounting portion 11 to which the dust collecting apparatus 100 is mountable. The dust collecting apparatus 100 may be detachably mounted to the mounting portion 11. The dust collecting apparatus 100 separates dust from the air suctioned through the suction part 21 and collects the separated dust such that purified air is directed to the fan motor through the second body port 10b.

The dust collecting apparatus 100 generates rotating airflow to separate dust from the air with centrifugal force. When a certain amount of dust is accumulated in the dust collecting apparatus 100, the user may detach the dust collecting apparatus 100 and remove the dust therefrom.

Figure 3:
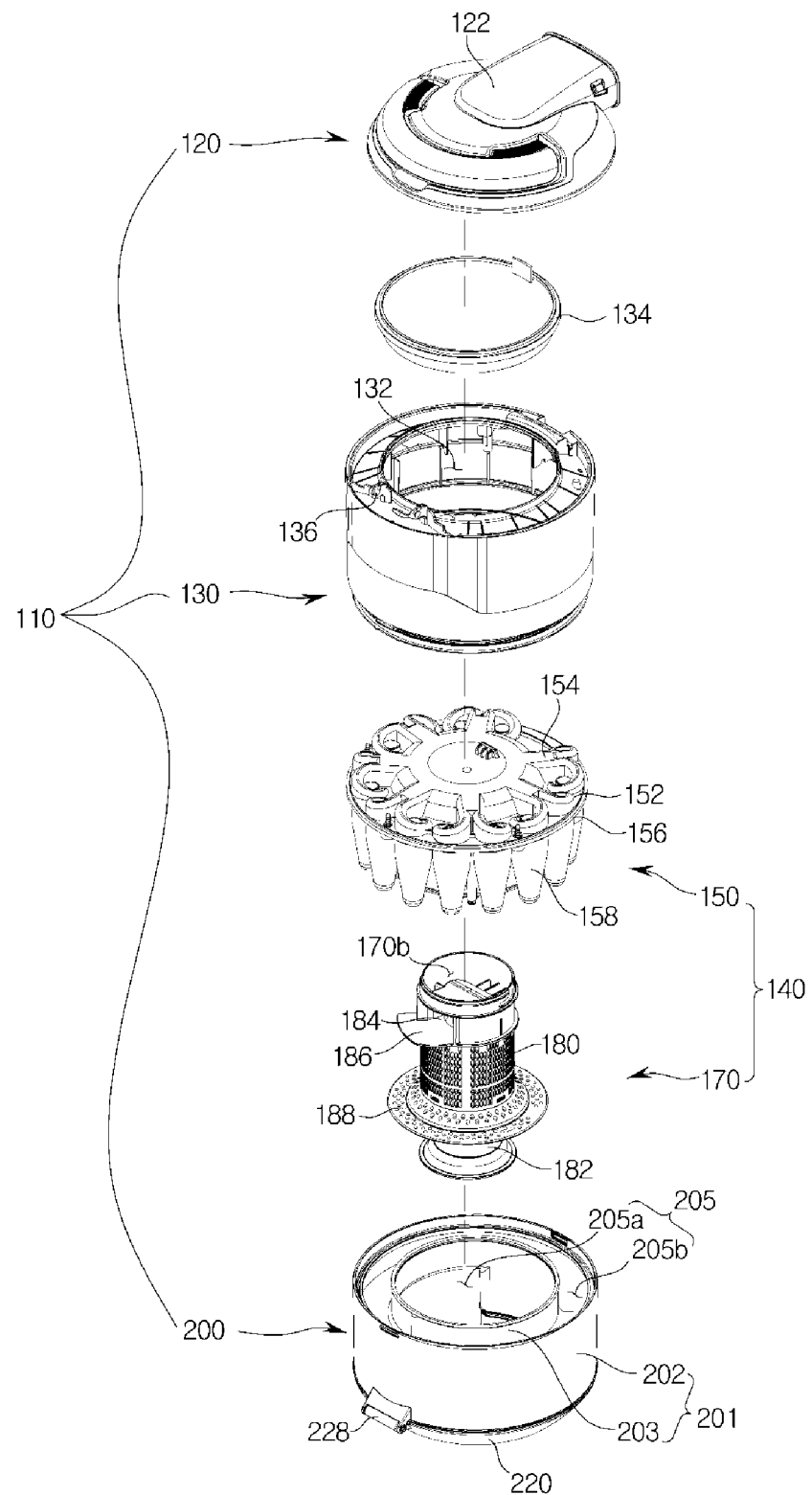
FIG. 3 is an exploded perspective view illustrating the cyclone dust collecting apparatus of a cleaner according to one embodiment of the present invention.
Figure 4:
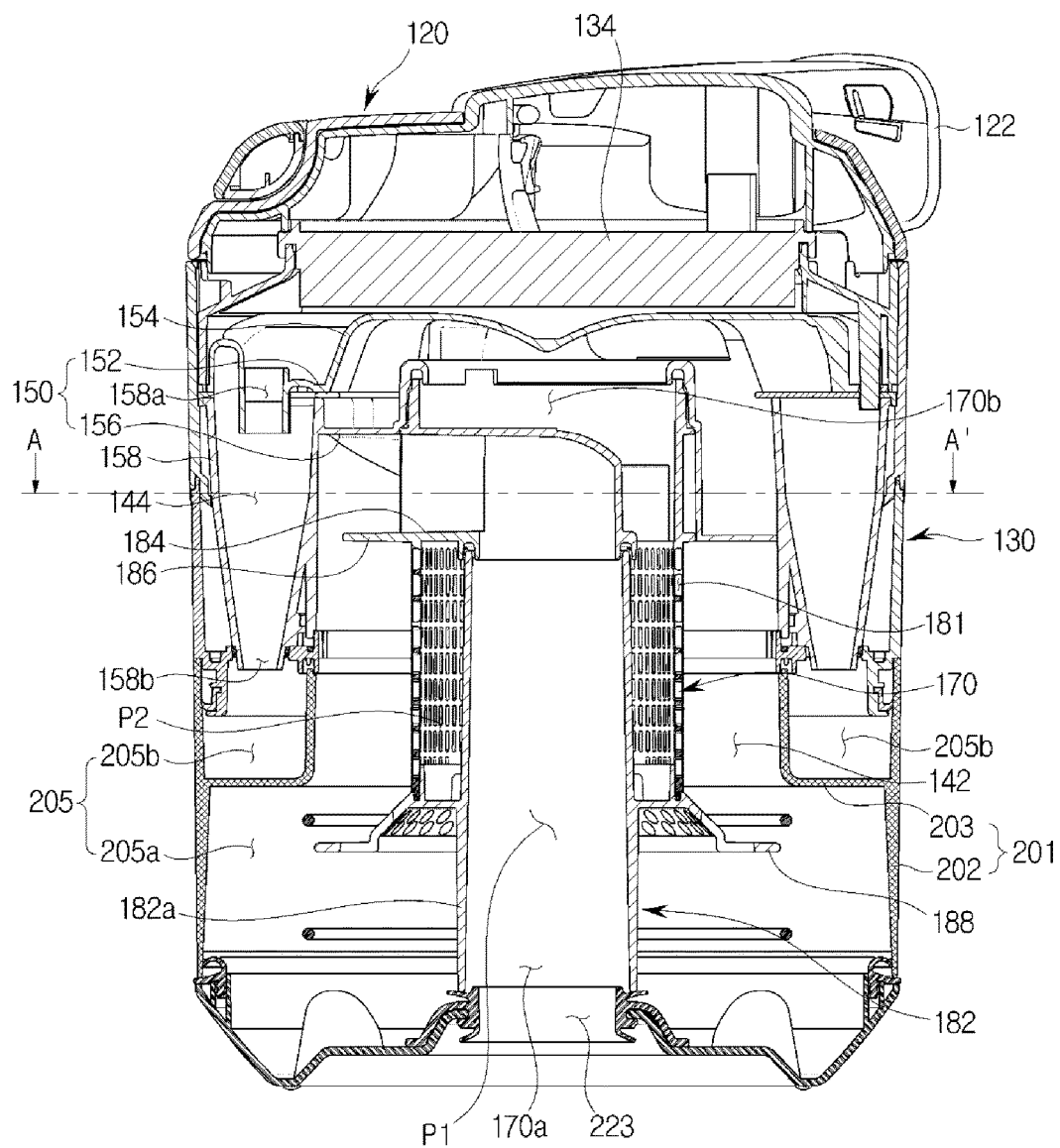
FIG. 4 is a cross-sectional view illustrating the cyclone dust collecting apparatus of a cleaner according to one embodiment of the present invention.

FIG. 3 is an exploded perspective view illustrating the cyclone dust collecting apparatus of a cleaner according to one embodiment of the present invention, and FIG. 4 is a cross-sectional view illustrating the cyclone dust collecting apparatus of the cleaner.

The dust collecting apparatus 100 includes a dust collection case 110 and a cyclone unit 140.

The dust collection case 110 is coupled to the body 10 to collect dirt such as dust in the air. The dust collection case 110 coupled to the body 10 may filter out dirt from the suctioned air and discharge purified air. Specifically, the dust collection case 110 includes a suction port 220a and a discharge port 122, in an embodiment. When the air suctioned through the suction part 21 is introduced into the dust collection case 110, dust is removed from the air in the dust collection case 110 and then the air is discharged from the body 10 through the discharge port 122.

The dust collection case 110 forms the external appearance of the dust collecting apparatus 100. A portion of the dust collection case 110 may be formed of a transparent material such the inner space of the dust collection case 110 is viewable. The dust collection case 110 may be formed approximately in a cylindrical shape, as shown in FIG. 3.

The dust collection case 110 may include an upper case 120, a middle case 130, and a dust collection container 200.

The middle case 130 may be formed in the shape of a cylinder having an open top and open bottom. In an embodiment, an upper portion of the middle case 130 includes a filter member 134 to re-filter out dirt from the air having passed through cyclone chambers 142 and 144. The filter member 134 may be disposed in an upper opening 132 provided to the upper portion of the middle case 130. The air introduced into the dust collection case 110 may be discharged from the dust collection case 110 after fine dust remaining in the air having passed through a main cyclone chamber 142 and an auxiliary cyclone chamber 144, which will be described later, is filtered out through the filter member 134.

The upper case 120 may be arranged at an upper portion of the middle case 130 and pivotably hinged to a hinge 136 provided to the middle case 130. The upper case 120 may include the discharge port 122 through which the air purified through the cyclone chambers 142 and 144 and the filter member 134 is discharged. The discharge port 122 may communicate with a fan motor chamber in the body in which a fan motor is arranged.

The dust collection container 200 is arranged at a lower portion of the middle case 130 such that dirt such as dust contained in the air is collected in the cyclone chambers 142 and 144.

The dust collection container 20 includes a container body 201 and a dust collection chamber 205 provided in the container body 201 to collect dirt. The cyclone chambers 142 and 144 include a main cyclone chamber 142 and an auxiliary cyclone chamber 144, as described below. The dust collection chamber 205 correspondingly includes a first dust collection chamber 205a, in which dirt separated from the air in the main cyclone chamber 142 is accumulated, and a second dust collection chamber 205b, in which dirt separated from the air in the auxiliary cyclone chamber 144 is accumulated. The auxiliary cyclone chamber 144 is disposed along the circumference of the main cyclone chamber 142 in a circumferential direction. Accordingly, the second dust collection chamber 205b may be disposed with respect to the first dust collection chamber 205a in a circumferential direction to correspond to the auxiliary cyclone chamber 144. That is, the second dust collection chamber 205b may be formed in an annular shape. Thereby, at least one portion of the second dust collection chamber 205b may be formed at the upper portion of the first dust collection chamber 205a along the circumference of the first dust collection chamber 205a.

The second dust collection chamber 205b may include a discharge chamber 205c. the discharge chamber 205c is adapted to collect the dirt accumulated in the second dust collection chamber 205b. The depth of the discharge chamber 205c may be greater than that of a portion of the second dust collection chamber 205b adjacent to the discharge chamber 205c. As will be described below, one end of the discharge chamber 205c may be opened and closed by a discharge cover 220. The discharge cover 220 and the opening and closing structure thereof will be discussed in detail below.

The container body 201 may include a container outer wall 202 and a container inner wall 203. The container outer wall 202 is formed in the shape of a cylinder having an open top and open bottom, and the container inner wall 203 is formed in the shape of a flange extending inward to have an annular space at the inner upper portion of the container outer wall 202. The first dust collection chamber 205a is surrounded by the inner side of the container outer wall 202, the inner side of the container inner wall 203, and the discharge cover 220. The second dust collection chamber 205b is surrounded by the inner side of the container outer wall 202, the inner side of the container inner wall 203, and the discharge cover 220.

At least one portion of the dust collection container 200 may be formed of a transparent material such that the dust collection chamber 205 is visible from the outside of the dust collection container 200.

The discharge cover 220 may include the suction port 220a. The suction port 220a allows the air introduced through the flexible hose 23 to be introduced into the dust collecting apparatus 100 and communicates with an introduction pipe 182, which will be described later. Disposition of the suction port 220a is not limited. However, in this embodiment, the suction port 220a is disposed at the cover body of the discharge cover 220 such that the air suctioned through the suction part 21 is introduced into the lower portion of the dust collection case 110, not introduced by going around the lateral surface of the dust collection case 110. Specifically, the suction port 220a is disposed at the center of a cover body 222 of the discharge cover 220.

The dust collection case 110 is provided therein with the cyclone unit 140.

The cyclone unit 140 generates rotating airflow such that dirt is separated from the air by centrifugal force. Rotating airflow is generated when the fan motor provided in the body 10 is driven.

Provided in the dust collection case 110 are the cyclone chambers 142 and 144, in which the rotating airflow is created by the suction force generated by the fan motor. The air and dust may be centrifugally separated from each other in the cyclone chambers 142 and 144 to filter out the dust. The cyclone chambers 142 and 144 include a main cyclone chamber 142 and an auxiliary cyclone chamber 144.

The main cyclone chamber 142 is defined by a grille unit 170, a cyclone body 150, and the dust collection case 110, which will be described later. The auxiliary cyclone chamber 144 is defined by the cyclone body 150 and a plurality of conical parts 158, which will be described later.

Figure 5:
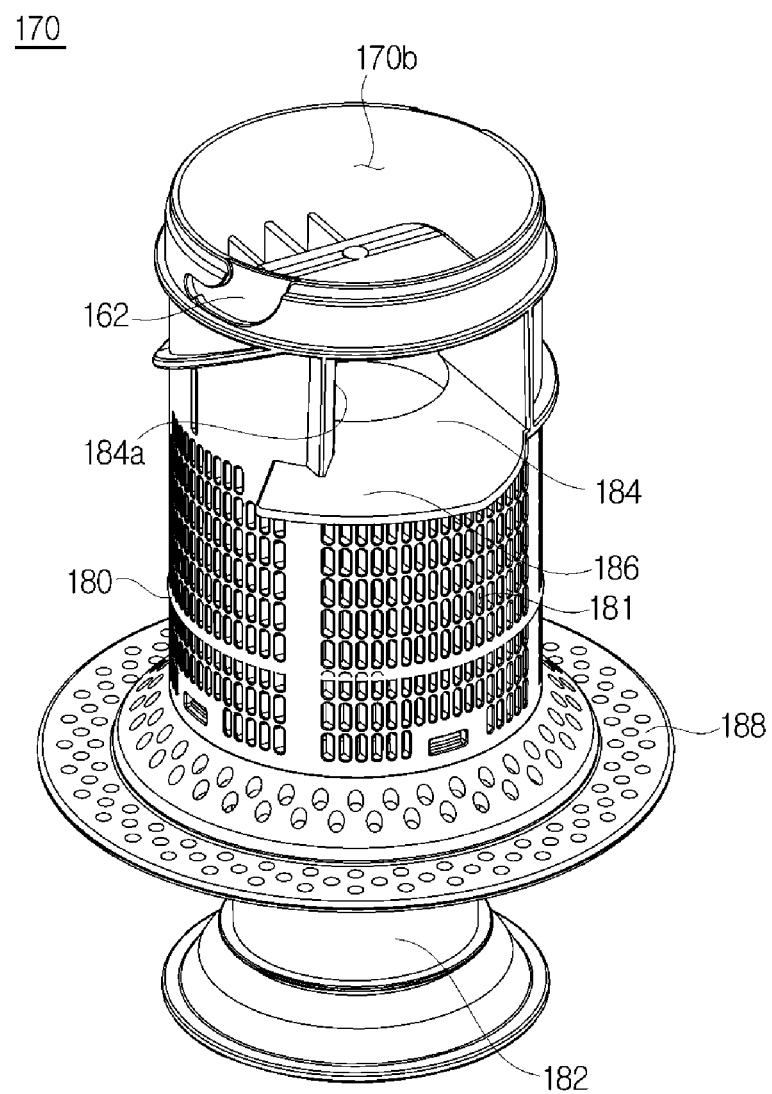
FIG. 5 is a perspective view illustrating a grille unit of a cleaner according to one embodiment of the present invention.
Figure 6:
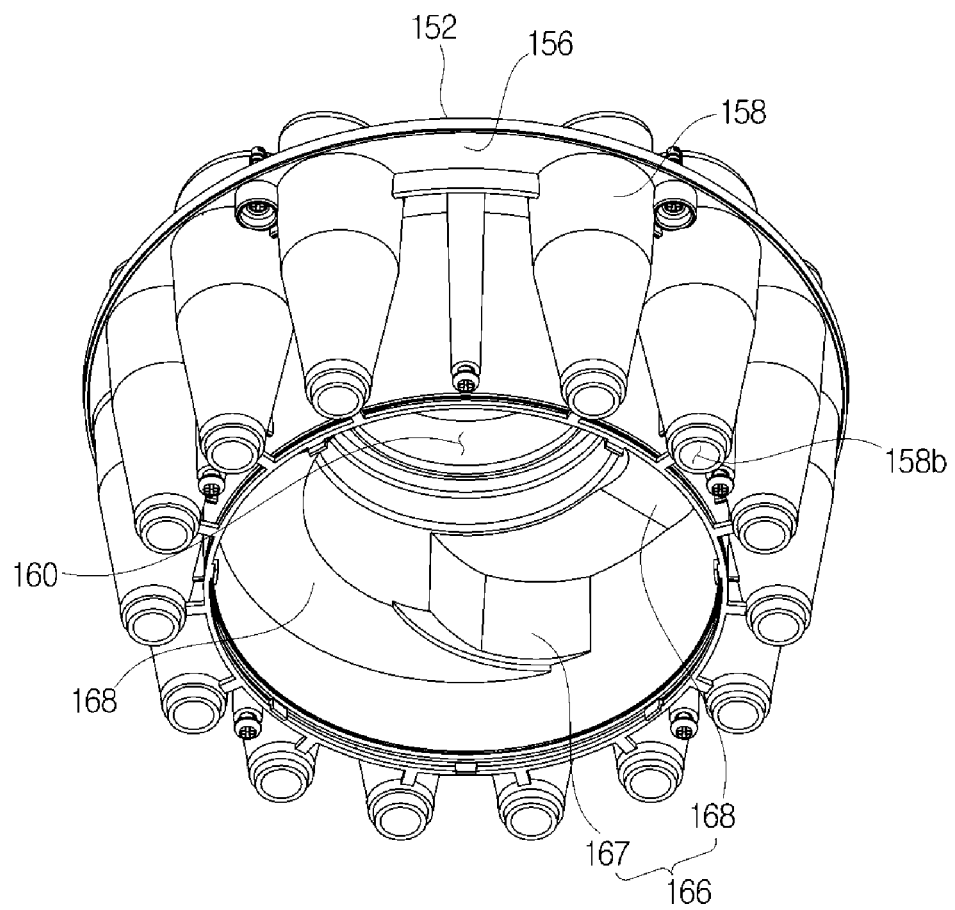
FIG. 6 is a perspective view illustrating a cyclone body of a cleaner according to one embodiment of the present invention.
Figure 7A:
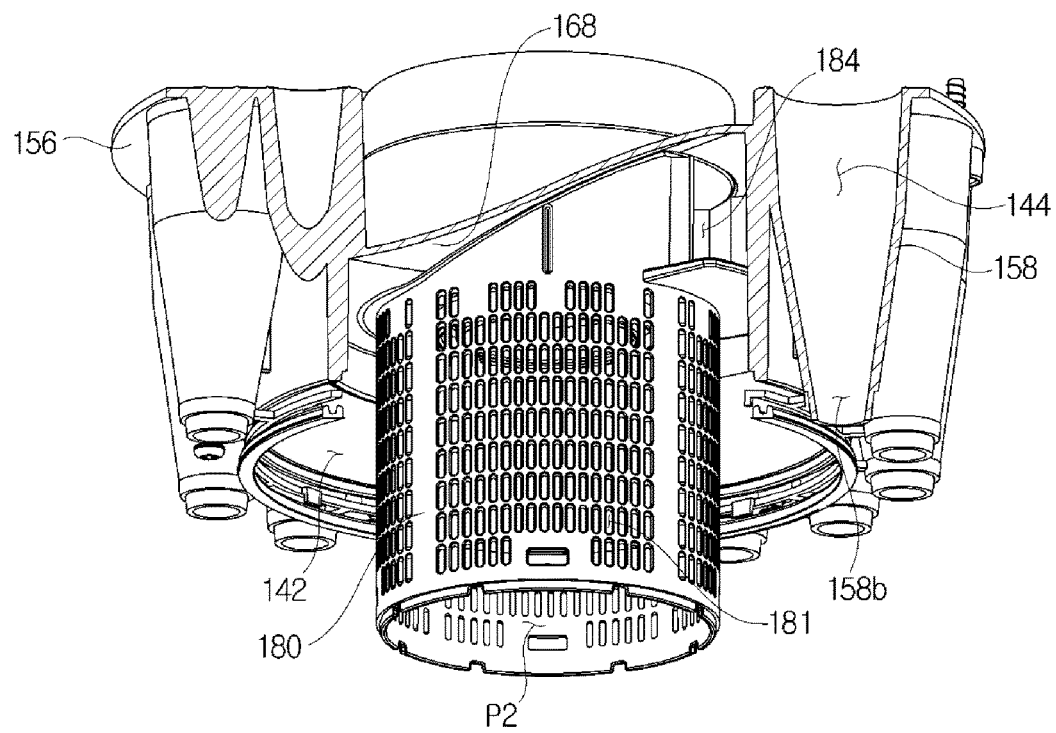
FIG. 7A is a partial cross-sectional view illustrating coupling between a grille unit and a cyclone body according to one embodiment of the present invention.

FIG. 5 is a perspective view illustrating a grille unit of a cleaner according to one embodiment of the present invention, and FIG. 6 is a perspective view illustrating a cyclone body of a cleaner according to one embodiment of the present invention. FIG. 7A is a partial cross-sectional view illustrating coupling between a grille unit and a cyclone body according to one embodiment of the present invention, and FIG. 7B is a cross-sectional view taken along line A-A' of FIG. 4.

The cyclone unit 140 may include a grille unit 170 and a cyclone body 150 to which the grille unit 170 is coupled.

The cyclone body 150 is disposed in the dust collection case 110 such that the grille unit 170 is seated on the cyclone body 150. The cyclone body 150 guides the air discharged from the main cyclone chamber 142 such that the air moves to the auxiliary cyclone chamber 144 via the grille unit 170.

The cyclone body 150 includes an upper cyclone body 152 and a lower cyclone body 156. The grille unit 170 and the conical parts 158 having the auxiliary cyclone chamber 144 therein are seated on the lower cyclone body 156. A guide conduit 154 is formed in the upper cyclone body 152 to guide the air discharged from the main cyclone chamber 142 such that the air passes through a grille body 180 and then flows into the auxiliary cyclone chamber 144.

The lower cyclone body includes a unit seating portion 160 allowing one end of the grille unit 170 to be seated thereon. The unit seating portion 160 may include a coupling protrusion (not shown) to fix the grille unit 170, and a coupling groove 162 corresponding to the coupling protrusion (not shown) may be formed in the grille unit 170.

The grille unit 170 is arranged in the dust collection case 110 to filter out dust particles greater than a certain size (i.e., a predetermined size or a maximum size) contained in the air discharged from the main cyclone chamber 142.

The grille unit 170 includes a grille body 180 and an introduction pipe 182.

The introduction pipe 182 guides the introduced air from the suction port 220a to the main cyclone chamber 142. Accordingly, the introduction pipe 182 is arranged such that one end thereof communicates with the suction port 220a, and the other end thereof communicates with the main cyclone chamber 142.

The introduction pipe 182 may include an introduction pipe body 182a, an introduction port 170a provided to one end of the introduction pipe body 182a to communicate with the suction port 220a, and a guide 184 provided to the other end of the introduction pipe body 182a to guide the air to the main cyclone chamber 142. The guide 184 may extend from the introduction pipe body 182a such that it is bent in a radial direction with respect to the longitudinal direction of the introduction pipe body 182a.

The guide 184 may include a discharge guide surface 184a formed in shape of a curved surface to allow the air guided through a first flow passage P1 in the introduction pipe body 182a to be spirally discharged with respect to the direction in which the first flow passage P1 extends. When the air discharged through the guide 184 is diverted in a circumferential direction by a first airflow guide surface 167, the discharge guide surface 184a allows natural directional diversion by causing the air to be discharged along a spiral path.

With the configuration as above, the air introduced through the suction part 21 passes through the introduction port 170a via the suction port 220a and flows into the introduction pipe 182. Then, the air is discharged into the main cyclone chamber 142 through the guide 184. The first flow passage P1 is formed in the introduction pipe 182 to allow the air introduced into the main cyclone chamber 142 to pass therethrough.

The grille body 180 is adapted to filter out dust particles greater than a certain size (i.e., a predetermined size, or a maximum size) in the main cyclone chamber 142.

The grille body 180 includes a discharge outlet 170b adapted to communicate with the discharge port 122. The air introduced from the main cyclone chamber 142 into the grille body 180 is discharged from the grille unit 170 through the discharge outlet 170b provided to an end of the grille body 180. Once discharged through the grille unit 170, the air is introduced into the main cyclone chamber 142 through the guide conduit 154.

The grille body 180 partitions the main cyclone chamber 142 from the discharge outlet 170b or the discharge port 122 such that the dust separated by the rotating airflow generated by the main cyclone chamber 142 is not discharged the discharge outlet 170b or the discharge port 122 via the main cyclone chamber 142. Specifically, the grille body 180 includes a plurality of air through holes 181 spaced a certain distance from each other. The air through holes 181 allow passage of the air from which dust has been centrifugally removed, but do not allow passage of dust therethrough.

The grille body 180 is detachable from the introduction pipe 182. While the grille body 180 and the introduction pipe 182 are illustrated as being detachable from each other in this embodiment, they may alternatively be integrated with each other. The grille body 180 is adapted to surround the introduction pipe 182 and is arranged such that a second flow passage P2 is formed between the outer surface of the introduction pipe 182 and the grille body 180. Specifically, the grille body 180 is formed to be spaced a certain distance from the outer surface of the introduction pipe 182. Thereby, the second flow passage P2 is formed between the grille body 180 and the outer surface of the introduction pipe 182.

With the configuration as above, the grille unit 170 may include both the first flow passage P1 formed in the introduction pipe 182 to guide the air introduced through the introduction port 170a and the second flow passage P2 formed between the introduction pipe 182 and the grille body 180 to guide the air introduced into the grille body 180 via the main cyclone chamber 142 to the discharge outlet 170b. The first flow passage P1 and the second flow passage P2 may be formed in the same direction. In another aspect, the introduction pipe body 182a and the grille body 180 may be disposed such that the centerlines thereof with respect to the longitudinal direction coincide with each other.

As it is possible to dispose both the first flow passage P1 and the second flow passage P2 in the grille unit 170, configuration of the cyclone unit 140 may be simplified. In addition, since it is possible to dispose the first flow passage P1 and the second flow passage P2 in the grille unit 170 in the same direction, the air introduced through the suction part 21 may be directly introduced into the cyclone chambers 142 and 144 without a separate air duct provided to guide the introduced air. Therefore, flow resistance may be reduced.

The cyclone unit 140 may include an airflow creation part 166 allowing the air guided from the introduction pipe 182 to the main cyclone chamber 142 to rotate.

The airflow creation part 166 is adapted to create rotating airflow in the air introduced into the main cyclone chamber 142. The airflow creation part 166 is provided to the cyclone body 150 such that rotating airflow is created when the air passing through the first flow passage P1 is discharged to the guide 184 and then introduced into the main cyclone chamber 142. While the airflow creation part 166 is illustrated as being formed at the cyclone body 150 in this embodiment, disposition and shape of the airflow creation part 166 are not limited thereto.

The airflow creation part 166 may be formed along the circumference of the grille unit 170. That is, the cyclone body 150 may be disposed around the grille unit 170. Thereby, the air discharged from the guide 184 may create rotating airflow around the grille unit 170 and undergo centrifugation in the main cyclone chamber 142.

The airflow creation part 166 may include a first airflow guide surface 167 and a second airflow guide surface 168.

The first airflow guide surface 167 is a guide surface having at least one portion of the surface concavely formed to contact the air discharged from the introduction pipe 182 such that the air guided to the main cyclone chamber 142 circumferentially rotates about the grille unit 170. That is, the first airflow guide surface 167 is concavely formed to divert the movement of the air the guide 184 into the circumferential direction. The first airflow guide surface 167 may have any concave shape. However, in the case that it is formed in the shape of a curved surface, the direction of flow of the air discharged from the guide 184 may be naturally changed.

The second airflow guide surface 168 is a guide surface that is inclined toward the main cyclone chamber 142 along a circumference around the grille unit 170. In this embodiment, the grille unit 170 is disposed at a lower portion of the cyclone body 150. Accordingly, the second airflow guide surface 168 protrudes downward from the cyclone body 150 along a circumference around the grille unit 170. This configuration allows the air rotated in a circumferential direction by the first airflow guide surface 167 to move toward the main cyclone chamber 142.

As the guide 184 provided to an end of the introduction pipe 182 is arranged adjacent to the air through holes 181, the air discharged from the guide 184 may accidentally be introduced directly into the air through holes 181.

In this regard, the grille unit 170 may further include an airflow creation rib 186.

The airflow creation rib 186 is arranged at a side of the grille unit 170 close to the main cyclone chamber 142 and adjacent to the guide 184 such that the air discharged from the guide 184 is introduced into the main cyclone chamber 142 while being spaced apart from the grille body 180.

That is, the airflow creation rib 186 extends from the guide 184 in the direction in which the rotating airflow is headed such that rotating airflow is created with the air discharged from the guide 184 being spaced from the grille body 180.

The grille unit 170 may further include a flange grille 188.

The flange grille 188 is arranged to partition the main cyclone chamber 142 and the first dust collection chamber 205a from each other. The flange grille 188 extends from the outer surface of the introduction pipe 182 to prevent the dust collected in the first dust collection chamber 205a from flowing back and moving into the main cyclone chamber 142.

The flange grille 188 may be formed in the shape of a grille to prevent movement of the dust and arranged to contact the lower portion of the grille body 180 such that the dust separated by centrifugation does not move into the second flow passage P2. The flange grille 188 may also be provided with air through holes 181 as provided to the grille body 180.

In addition, the flange grille 188 may be arranged to be inclined toward the first dust collection chamber 205a in order to prevent backflow of the air heading from the first dust collection chamber 205a to the main cyclone chamber 142. That is, as the flange grille 188 is formed in the shape of a flange between the main cyclone chamber 142 and the first dust collection chamber 205a and inclined toward the first dust collection chamber 205a, backflow from the first dust collection chamber 205a may be effectively prevented.

The cyclone unit 140 may further include an auxiliary cyclone chamber 144.

The auxiliary cyclone chamber 144 is disposed in a radial direction of the main cyclone chamber 142 such that the air having undergone primary filtering of dust in the main cyclone chamber 142 secondarily undergoes centrifugation. Specifically, the air introduced into the grille unit 170 from the main cyclone chamber 142 in the cyclone body 150 moves to the conical parts 158 through the guide conduit 154 of the cyclone body 150. The auxiliary cyclone chamber 144, which is arranged within the conical parts 158, secondarily filters out dust in the air through centrifugation.

Upper portions of the conical parts 158 are provided with air discharge outlets 158a and lower portions thereof are provided with dust discharge outlets 158b. Thereby, air and dust separated from each other through centrifugation are respectively discharged from the conical parts 158. The dust discharged through the dust discharge outlets 158b falls into the second dust collection chamber 205b where the dust is collected.

The cyclone chambers 142 and 144 include a main cyclone chamber 142 and an auxiliary cyclone chamber 144, which may respectively be defined as a first cyclone chamber and a second cyclone chamber.

Hereinafter, movement of air in the dust collecting apparatus 100 under the configuration as above will be described.

Figure 8:
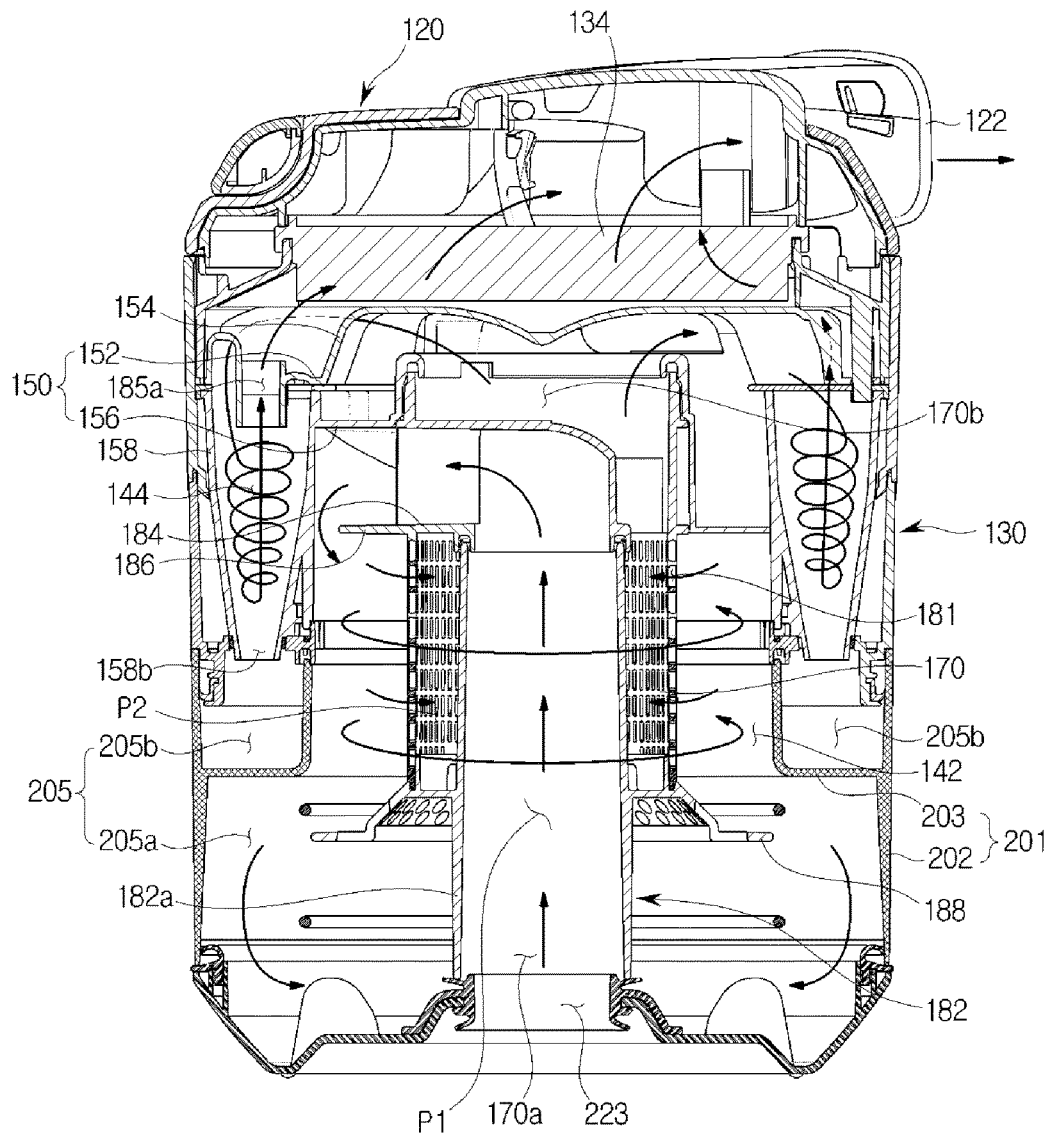
FIGS. 8 and 9 are views illustrating movement of air in a cyclone dust collecting apparatus according to one embodiment of the present invention.
Figure 9:
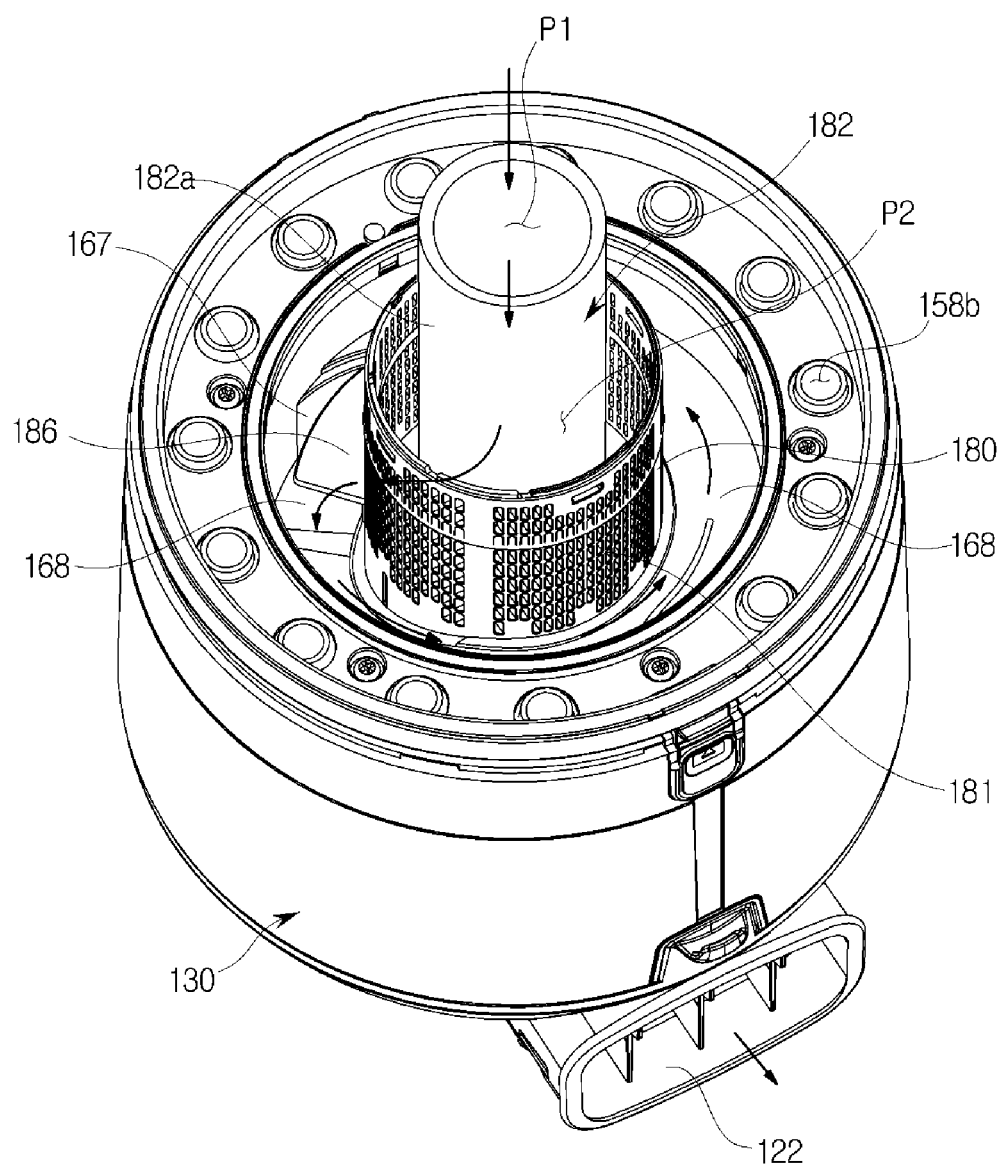

FIGS. 8 and 9 are views illustrating movement of air in a cyclone dust collecting apparatus according to one embodiment of the present invention.

The air introduced through the suction part 21 flows into the dust collecting apparatus 100 via the extension pipe 20 and the flexible hose 23. A lower portion of the dust collecting apparatus 100 includes the suction port 220a. Thereby, the air introduced through the flexible hose 23 may directly move into the dust collecting apparatus 100 without bypassing the side portion of the main cyclone chamber 142.

The air introduced into the dust collecting apparatus 100 flows into the grille unit 170 through the introduction port 170a in communication with the suction port 220a in the dust collecting apparatus 100, and is then guided through the first flow passage P1 of the introduction pipe 182. After passing through the first flow passage P1, the air is discharged to the main cyclone chamber 142 through the guide 184. The air discharged through the guide 184 is caused to be spirally discharged by the discharge guide surface 184a.

When the air is discharged, rotating airflow is created by the airflow creation part 166. Specifically, circumferential airflow is generated by the first airflow guide surface 167, and upward airflow is created by the second airflow guide surface 168.

At this time, rotating airflow radially spaced apart from the grille unit 170 is created in the air discharged from the airflow creation part 166 by the airflow creation rib 186. That is, the airflow creation rib 186 prevents the air discharged through the guide 184 from being directly introduced into the grille body 180.

In the main cyclone chamber 142, the air creating the rotating airflow is separated from dust by centrifugation. After the centrifugation, the dust is collected in the first dust collection chamber 205a, and the air separated from the dust is discharged to the discharge outlet 170b through the second flow passage P2 formed in the grille body 180. The flange grille 188, which is formed between the first dust collection chamber 205a and the main cyclone chamber 142, is adapted to prevent backflow of air into the main cyclone chamber 142 even when rotating airflow is created in the first dust collection chamber 205a.

The air discharged from the discharge outlet 170b moves to the auxiliary cyclone chamber 144 through the guide conduit 154 of the cyclone body 150. The auxiliary cyclone chamber 144 is provided in the conical parts 158. Thereby, the air creates rotating airflow in the auxiliary cyclone chamber 144 and undergoes centrifugation.

Through this process, the dust is discharged to the second dust collection chamber 205b through the dust discharge outlet 158b, and the air separated from the dust is discharged from an upper portion of the cyclone body 150 through the air discharge outlet 158a.

The air discharged from the upper portion of the cyclone body 150 passes through the filter member 134 and is then discharged through the discharge port 122 and suctioned into the body.

Figure 10:
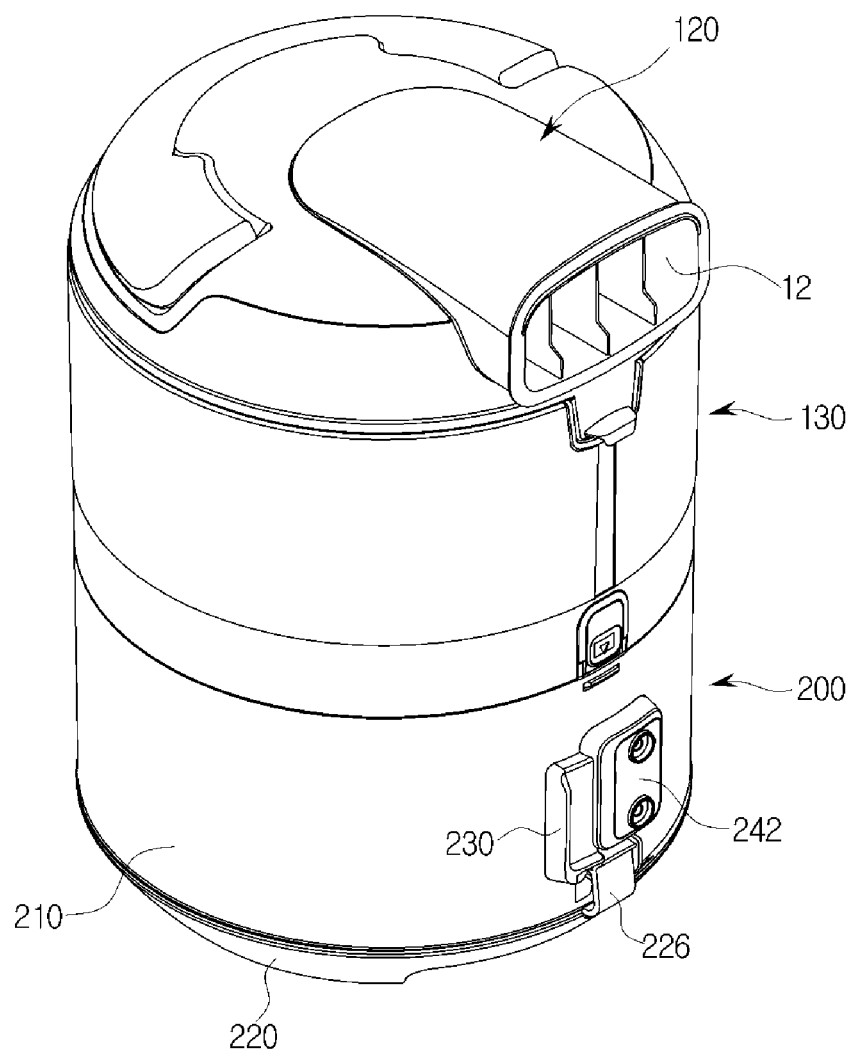
FIG. 10 is a perspective view illustrating a cyclone dust collecting apparatus according to one embodiment of the present invention.
Figure 11:
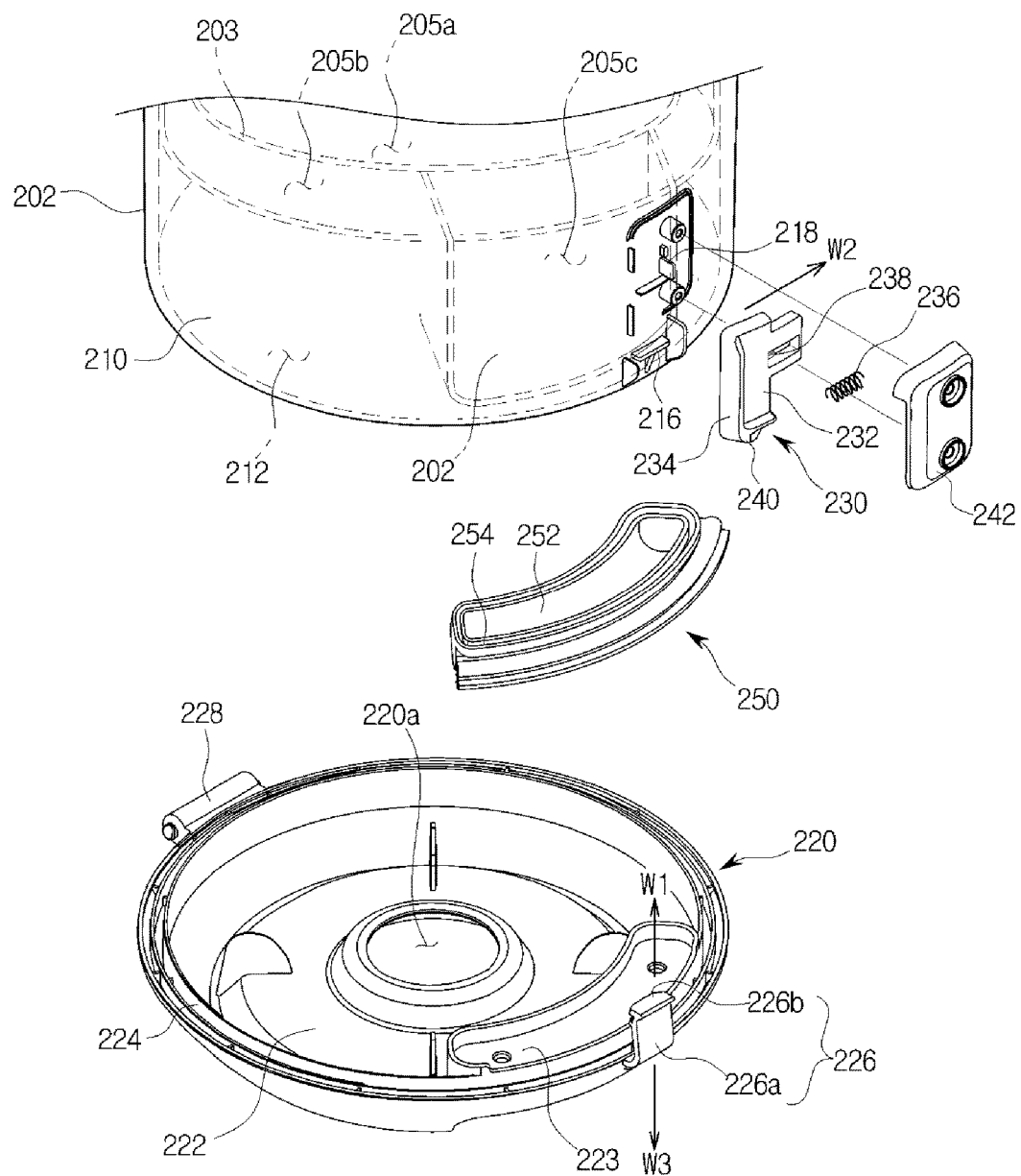
FIG. 11 is an exploded view illustrating a cyclone dust collecting apparatus according to one embodiment of the present invention.
Figure 12:
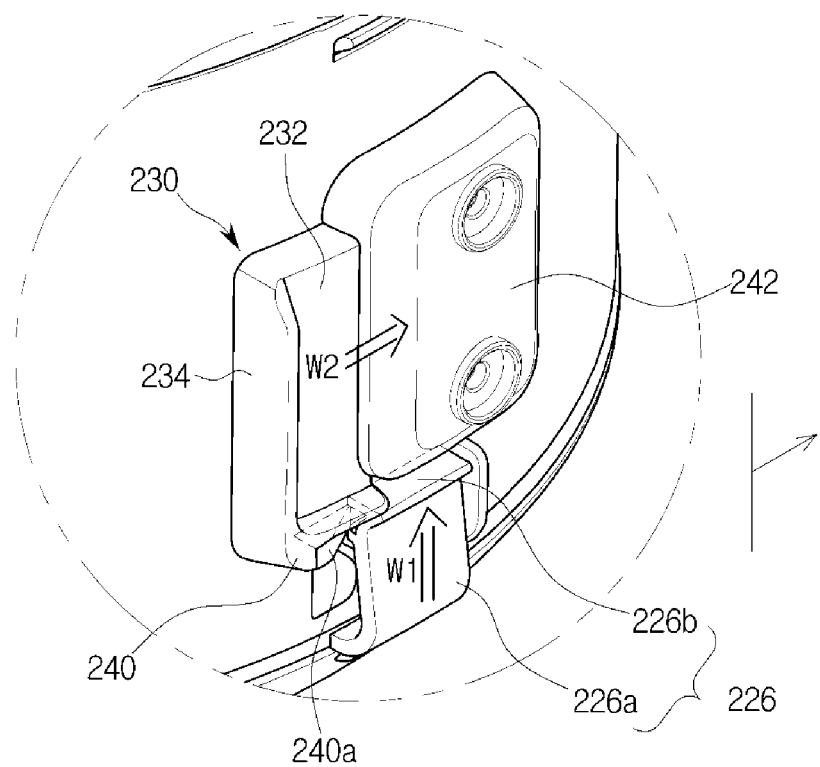
FIG. 12 is an enlarged view illustrating a portion of a cyclone dust collecting apparatus according to one embodiment of the present invention.
Figure 13:
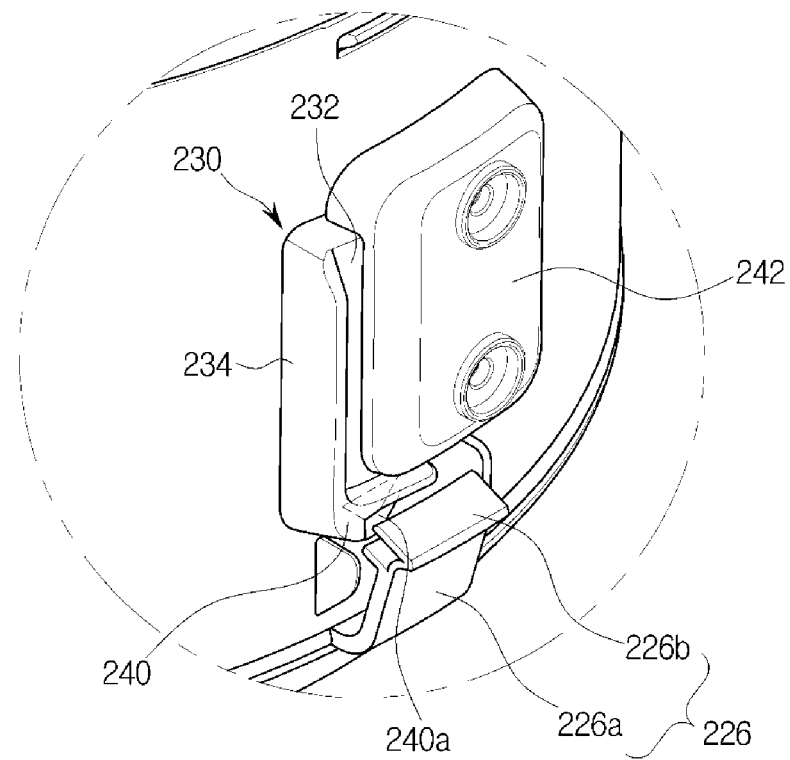
FIG. 13 is a view illustrating operation of an opening and closing device according to one embodiment of the present invention.
Figure 14:
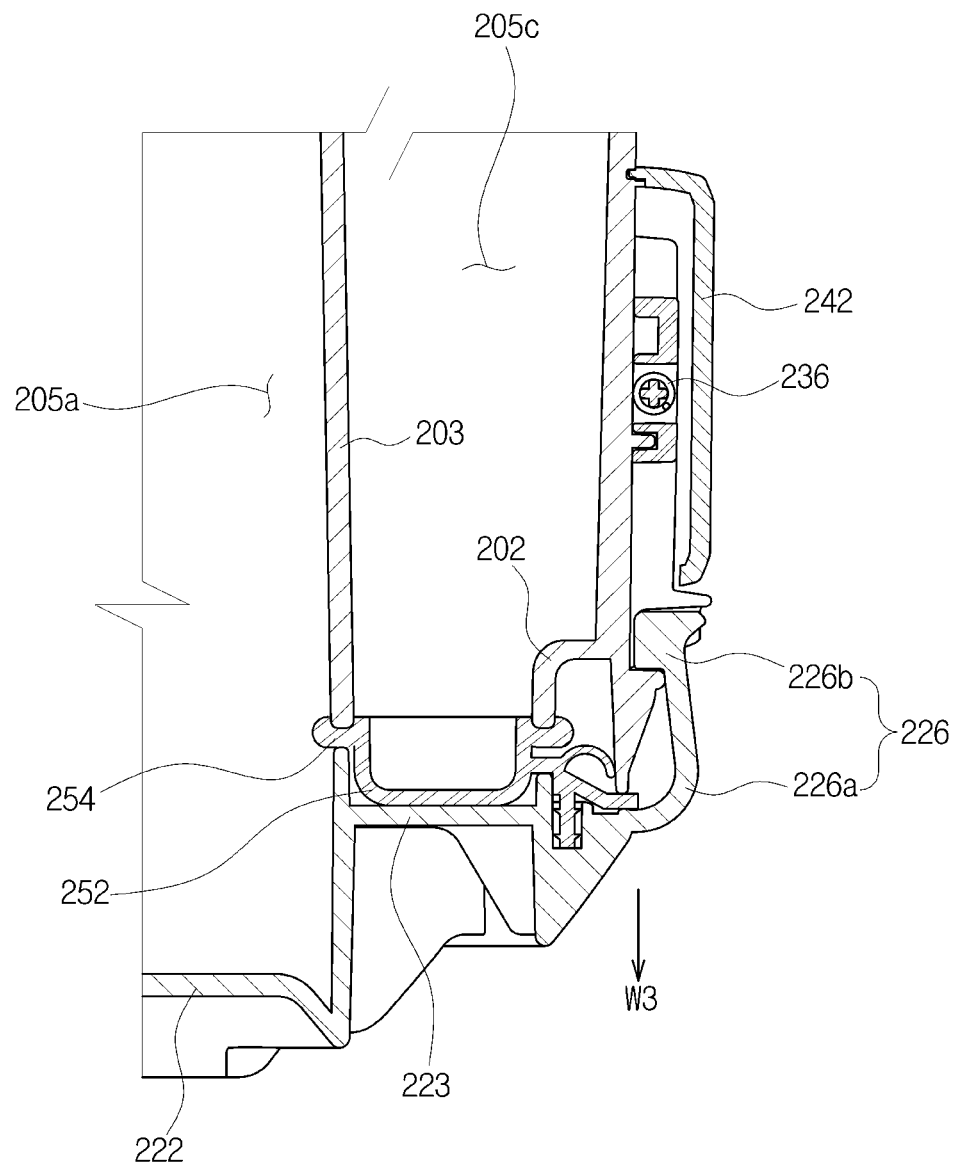
FIG. 14 is a cross-sectional view illustrating a portion of a cyclone dust collecting apparatus according to one embodiment of the present invention.

FIG. 10 is a perspective view illustrating a cyclone dust collecting apparatus according to one embodiment of the present invention, FIG. 11 is an exploded view illustrating a cyclone dust collecting apparatus according to one embodiment of the present invention, and FIG. 12 is an enlarged view illustrating a portion of a cyclone dust collecting apparatus according to one embodiment of the present invention. FIG. 13 is a view illustrating operation of an opening and closing device according to one embodiment of the present invention, FIG. 14 is a cross-sectional view illustrating a portion of a cyclone dust collecting apparatus according to one embodiment of the present invention, and FIG. 15 is a view illustrating an operation of opening a cyclone dust collecting apparatus according to one embodiment of the present invention.

The dust collecting apparatus 100 may include a dust collection container 200, an opening and closing member 230, and a cover spacing member 250.

The dust collection container 200 is arranged in the dust collection case 110 to collect dirt in the air. The dust collection container 200 is adapted to collect dust or dirt separated by the cyclone unit 240. An opening 212 is formed at one side of the dust collection container 200. The opening 212 is opened and closed by the discharge cover 220. Specifically, the first dust collection chamber 205a, the second dust collection chamber 205b and the discharge chamber 205c may be opened and closed by the discharge cover 220. By opening and closing the discharge cover 220, dust or dirt accommodated in the first dust collection chamber 205a, the second dust collection chamber 205b and the discharge chamber 205c, which are provided in the dust collection container 200, may be discharged.

The discharge cover 220 may be adapted to open and close the opening 212 of the dust collection container 200. With this configuration, dust and dirt filling the dust collection container 200 may be discharged by opening the discharge cover 220, and then the dust collection container 200 may be closed and reused.

The discharge cover 220 may include a cover body 222 to cover the opening 212 of the dust collection container 200, a catch member 226 provided to one end of the cover body 222, and a cover hinge 228 provided to the other end of the cover body 222.

A sealing member 224 is provided to one side surface of the cover body 222. The sealing member 224 may prevent leakage of dust or dirt from the opening 212 of the dust collection container 200 when the opening 212 is closed in a sealing manner.

The cover hinge 228 allows the dust collection container 200 and the cover body 222 to be hinged to each other such that the discharge cover 220 may pivotably rotates with respect to the dust collection container 200. Specifically, the dust collection container 200 includes a hinge connector (not shown) arranged at one open side thereof. By hinging the hinge connector (not shown) to the cover hinge 228, the discharge cover 220 may pivotably rotate about a hinge axis.

Engagement between the catch member 226 and a fixed protrusion is released by the opening and closing member 230, which will be described later. That is, when one open side of the dust collection container 200 is closed by the discharge cover 220 in a sealing manner, the dust collection container 200 may be maintained in a sealed state by engagement between the catch member 226 and the fixed protrusion. When the open side is opened, the opening and closing member 230 may release engagement of the catch member 226.

The catch member 226 may include a catch member body 226a extending from the cover body 222 along the outer surface of the dust collection container 200, and a catch protrusion 226b provided to an end of the catch member body 226a and protruding toward the dust collection container 200 to be caught by the fixed protrusion. The direction in which the catch member body 226a extends toward the dust collection container 200 may be defined as a first direction w1. However, the first direction w1 is not limited thereto. Any direction in which the discharge cover 220 extends toward the dust collection container 200 to be fixed to the outer surface of the dust collection container 200 may be the first direction. In this embodiment, the first direction w1 is a direction perpendicular to the discharge cover 220.

The catch member body 226a may be formed in a certain curvature to allow the catch protrusion 226b to closely contact the dust collection container 200 such that the catch protrusion 226b does not easily escape from the fixed protrusion.

The opening and closing member 230 may include an opening and closing member body 232, a push part 234, a restorable elastic part 236, elastic pressing parts 254 and 238, and a catch release part 240.

As described above, the opening and closing member 230 is adapted to space the catch member 226 from the fixed protrusion of the dust collection container 200.

The opening and closing member body 232 is slidably movable along the outer surface of the container body 201. Specifically, the opening and closing member body 232 is slidably movable in a second direction w2 perpendicular to the first direction w1 in which the catch member 226 is formed. With this configuration, the opening and closing member 230 may merely serve to space the catch member 226 formed at the discharge cover 220 apart from the fixed protrusion rather than to directly push the discharge cover 220. In other words, the direction of movement of the opening and closing member 230 may be perpendicular to the direction in which the discharge cover 220 is spaced apart from the dust collection container 200.

The opening and closing member body 232 may be formed with a certain curvature to be slidable on the outer surface of the dust collection container 200 having a cylindrical structure. Herein, the certain curvature may be identical to the curvature of the outer surface of the dust collection container 200. However, embodiments of the present invention are not limited thereto. In the case that a portion of the dust collection container 200 on which the opening and closing member 230 is disposed has a flat surface, the opening and closing member 230 may be formed in the shape of a flat surface.

The push part 234 is formed at the opening and closing member body 232 to be subject to external force. The push part 234 may be formed to have a wider area than the adjoining portion of the opening and closing member body 232 such that external force is easily applied to the push part 234.

The restorable elastic part 236 applies a force in the direction opposite to the direction in which external force is applied to the push part 234 such that the opening and closing member 230 caused to slide by pressure from the push part 234 returns to an original position thereof. The restorable elastic part 236 may be formed of an elastic member to generate force that returns the opening and closing member 230 to the original position thereof. In this embodiment, the restorable elastic part 236 is shaped as a spring. However, it may take any form so long as the opening and closing member 230 is returned to the original position thereof.

The restorable elastic part 236 may be arranged between the elastic pressing parts 254 and 238, which are formed on the opening and closing member body 232, and an elastic support 218 protruding from the outer side surface of the dust collection container 200. With this configuration, when the opening and closing member body 232 is moved in the second direction w2 by external force applied by the push part 234, the restorable elastic part 236 may apply external force to press the opening and closing member body 232 in the opposite direction to the external force.

The catch release part 240 is a constituent of the opening and closing member body 232 that directly contacts the catch protrusion 226b of the catch member 226. The catch release part 240 directly contacts the catch protrusion 226b to push the catch protrusion 226b outward of the dust collection container 200 such that the catch protrusion 226b is spaced apart from the fixed protrusion.

The catch release part 240 includes a catch release surface 240a inclined in the direction opposite to the direction w2 in which the opening and closing member body 232 extends. When the opening and closing member body 232 is moved in the second direction w2 by the external force applied by the push part 234, the catch protrusion 226b rises along the slope of the catch release surface 240a and is spaced apart from the dust collection container 200. Thereby, the catch protrusion 226b in contact with one surface of the fixed protrusion may be spaced from the fixed protrusion, and accordingly the discharge cover 220 may be released.

The opening and closing member 230 may further include a cover 242. The cover 242 is arranged such that some constituents of the opening and closing member 230 are not exposed outside. Thereby, it may enhance durability of the opening and closing member 230. Specifically, the cover 242 may cover the constituents of the opening and closing member 230 except the push part 234 and the catch release part 240.

The cover spacing member 250 is a constituent that facilitates opening of the discharge cover 220 when the discharge cover 220 on the dust collection container 200 is opened. The cover spacing member 250 may be formed to correspond to the lower portion of the discharge chamber 205c.

The cover spacing member 250 may be formed of any material. In the case that the cover spacing member 250 is formed of an elastic material, it may be elastically compressed when the dust collection container 200 is closed and push the discharge cover 220 with elastic force generated in the cover spacing member 250 when the dust collection container 200 is opened.

The cover spacing member 250 is provided between the container body 201 and the discharge cover 220. Thereby, it may space the discharge cover 220 away from the container body 201 in a third direction w2 opposite to the first direction w1. The opening and closing member 230 and the cover spacing member 250 are not dependent constituents. Rather, the opening and closing member 230 is adapted to move in the second direction w2, and the cover spacing member 250 is adapted to independently push the discharge cover 220 away from the container body 201 in the third direction w3. With this configuration, a larger force is not needed to operate the opening and closing member 230, which may be an opening and closing button, even when dirt and debris is stuck between the discharge cover 220 and the container body 201. That is, even though there are several variables such as the amount of dirt in the dust collection container 200 and the condition of spacing between the discharge cover 220 and the container body 201, when the same force is applied to cause the opening and closing member 230, which may be a opening and closing button, to slide, the discharge cover 220 is opened by the elastic force of the cover spacing member 250 applied thereto. Therefore, product quality may be improved.

The cover spacing member 250 may be formed in any shape. The cover spacing member 250 may be provided to the dust collection container 200 to space the discharge cover 220 from the dust collection container 200 as in the illustrated embodiment.

The cover spacing member 250, the cover hinge 228 and the catch member 226 may be disposed in the same line. As the cover hinge 228, the cover spacing member 250 and the catch member 226 are disposed in the same line, the cover spacing member 250 pushes the discharge cover 220 away from the line when the catch member 226 escapes from the fixed protrusion. Accordingly, the discharge cover 220 may be more effectively opened according to the principle of the lever.

The cover spacing member 250 may include a seating part 252 and a pressing part 254.

The seating part 252 allows the cover spacing member 250 to be seated on or fixed to a concave part 223 provided to the discharge cover 220. In this embodiment, the discharge cover 220 includes a concave part 223 formed in the shape of an arc with a certain length on the inner side surface thereof to correspond the cylindrical shape of the dust collection container 200. The concave part 223 is concavely formed with respect to the cover body. The seating part 252 may be seated on the concave part 223 of the discharge cover 220.

The pressing part 254 is formed along the circumference of the cover spacing member 250 to correspond to the shape of an end of the opening 212 of the container body 201 forming the discharge chamber 205c. The pressing part 254 is elastically formed. The pressing part 254 is disposed such that the elastic material thereof is compressed when the discharge cover 220 is closed, and applies force, when the discharge cover 220 is opened, in the direction in which the elastic material extends with respect to the end of the opening 212 of the container body 201 forming the discharge chamber 205c.

Hereinafter, operation of the dust collecting apparatus configured as above and a cleaner having the same will be described.

A description will first be given of sealing the dust collecting apparatus 200 with reference to FIGS. 12 and 14.

In sealing the dust collecting apparatus 200, the discharge cover 220 is pivotably rotated such that external force is applied to allow the catch member 226 to be caught by the fixed protrusion provided to the dust collection container 200.

One surface of the catch protrusion 226b of the catch member 226 comes into contact with a corresponding surface of the fixed protrusion. Thereby, pivotal rotation of the discharge cover 220 is restricted, and the dust collecting apparatus 200 is maintained in a sealed state.

At this time, elastic force is produced in the cover spacing member 250 according to compression of the pressing part 254.

Next, a description will be given of opening the dust collecting apparatus 200 with reference to FIGS. 13 and 15.

In opening the dust collecting apparatus 200, external force is applied to the push part 234 such that the opening and closing member 230 slides in the second direction w2. As the opening and closing member 230 slides in the second direction w2, the catch protrusion 226b rises along the catch release surface 240a of the catch release part 240 and becomes spaced from the fixed protrusion. Thereby, the discharge cover 220 is released from the dust collection container 200.

Then, the cover spacing member 250 applies pressure to the container body 201 with elastic force. Since the cover spacing member 250 is in a compressed state according to sealing of the discharge cover 220, it pushes the discharge cover 220 away from the container body 201 at the same time as the discharge cover 220 is released. As a result, the discharge cover 220 is spaced from the dust collection container 200 and opened.

As is apparent from the above description, a cyclone dust collecting apparatus according to one embodiment and a cleaner having the same includes an improved structure of internal flow passages. Accordingly, configuration thereof may be simplified and flow resistance may be reduced.

In addition, the improved structure of the cyclone unit may maximize and design efficiencies and visualize the dust collection chamber. Accordingly, a user may gain satisfaction from cleaning operation.

In addition, as opening and closing of the dust collecting apparatus is facilitated, the discharge cover may be easily opened and closed.

Finally, since the discharge cover is designed to be opened by pushing, the dust discharge cover may be easily opened even in the case that the discharge cover is stuck to the dust collecting apparatus due to dirt or a sealing member.

Although a few embodiments of the present invention have been shown and described, it would be appreciated by those skilled in the art that changes may be made to the embodiments without departing from the principles and spirit of the invention, the scope of which is defined in the claims and their equivalents.

What is claimed is:

1. A dust collecting apparatus comprising: a dust collecting case including a dust separation part to separate dust from air suctioned thereinto; a dust collection container including a dust collection chamber to collect the dust separated from the air, an opening to open the dust collection chamber, and a fixed protrusion formed on a surface of the dust collection container adjacent to the opening, the dust collection container being arranged at one side of the dust collecting case; a discharge cover including a cover body to open and close the opening, and a catch member adapted to be restricted by the fixed protrusion at the one side of the cover body, the discharge cover being pivotably hinged to the dust collecting case; an opening and closing member formed on one side surface of the dust collection container to release the catch member from restriction by the fixed protrusion, the opening and closing member including: an opening and closing member body adapted to slide along the one side surface of the dust collection container, a catch release part provided to the opening and closing member body to space the catch member from the fixed protrusion, a restorable elastic part to press the opening and closing member body toward an original position of the opening and closing member body when the opening and closing member body slides, an elastic pressing part allowing the restorable elastic part to be elastically supported by the opening and closing member body, a cover spacing member between the dust collection container and the discharge cover to space the dust collection container and the discharge cover apart from each other, the cover spacing member including: a seating part adapted to be seated on an inner side surface of the discharge cover; and a pressing part arranged along a circumference of the seating part and adapted to push the dust collection container through elasticity thereof when the discharge cover is opened.

2. The dust collecting apparatus according to claim 1, wherein a direction of movement of the opening and closing member is perpendicular to a direction of the discharge cover being spaced from the dust collection container.

3. The dust collecting apparatus according to claim 1, wherein the catch release part comprises a catch release surface inclined in a direction opposite to a direction of movement of the opening and closing member body to space the catch member apart from the fixed protrusion.

4. The dust collecting apparatus according to claim 1, wherein the catch member comprises: a catch member body extending from the discharge cover toward an outside of the dust collection container; and a catch protrusion provided to an end of the catch member body and adapted to be caught by the fixed protrusion.

5. The dust collecting apparatus according to claim 1, wherein the cover spacing member is formed of a material having elasticity.

6. The dust collecting apparatus according to claim 1, wherein the cover spacing member applies elastic force toward the dust collection container to space the discharge cover apart from the dust collection container.

7. The dust collecting apparatus according to claim 1, wherein the dust collection container is formed in a cylindrical shape, and the cover spacing member is formed in an arc shape at an inner side of the discharge cover.

8. The dust collecting apparatus according to claim 1, wherein the discharge cover comprises a cover hinge adapted be hinged to the dust collection container, wherein the cover hinge, the cover spacing member, and the catch member are disposed in the same line.

9. The dust collecting apparatus according to claim 1, wherein the opening and closing member has a first curvature.

10. The dust collecting apparatus according to claim 9, wherein the first curvature is substantially identical to a second curvature of the outer surface of the dust collection container.

11. A dust collecting apparatus comprising: a dust collecting case including a dust separation part to separate dust from air suctioned thereinto; a dust collection container including an opening having one open surface and disposed at one side of the dust collecting case; a discharge cover including a catch member extending from one side thereof toward the dust collection container in a first direction to be detachably connected to the dust collection container, the other side of the discharge cover being pivotably hinged to the dust collection container to open and close the opening; an opening and closing member to move in a second direction perpendicular to the first direction to allow the catch member to escape from the dust collection container, the an opening and closing member body adapted to slide along the one side surface of the dust collection container, a catch release part provided to the opening and closing member body to space the catch member from the fixed protrusion, a restorable elastic part to press the opening and closing member body toward an original position of the opening and closing member body when the opening and closing member body slides, an elastic pressing part allowing the restorable elastic part to be elastically supported by the opening and closing member body, a cover spacing member provided between the dust collection container and the discharge cover to space the discharge cover apart from the dust collection container in a third direction opposite to the first direction, the cover spacing member including: a seating part adapted to be seated on an inner side surface of the discharge cover; and a pressing part arranged along a circumference of the seating part and adapted to push the dust collection container through elasticity thereof when the discharge cover is opened.

12. The dust collecting apparatus according to claim 11, wherein the opening and closing member and the cover spacing member operate independently.

13. The dust collecting apparatus according to claim 11, wherein the discharge cover comprises a unit seating portion allowing the cover spacing member to be seated thereon, wherein the unit seating portion is disposed closer to the one side of the discharge cover than to the other side of the discharge cover.

14. The dust collecting apparatus according to claim 11, wherein the cover spacing member is disposed at the other side of the discharge cover with respect to the one side of the discharge cover pivotably hinged to the dust collection container.

15. The dust collecting apparatus according to claim 11, wherein the discharge cover comprises a hinge adapted to be hinged to the dust collection container, wherein the hinge, the cover spacing member, and the catch member are disposed in the same line.

16. The dust collecting apparatus according to claim 11, wherein the opening and closing member has a predetermined curvature.

* * * * *